(12) United States Patent
Takase et al.

(10) Patent No.: US 12,710,630 B2
(45) Date of Patent: Aug. 18, 2026

(54) LIGHT DETECTION ELEMENT AND ELECTRONIC APPARATUS

(71) Applicant: SONY SEMICONDUCTOR SOLUTIONS CORPORATION, Kanagawa (JP)

(72) Inventors: Hiroaki Takase, Kanagawa (JP); Kaito Yokochi, Kanagawa (JP); Koji Miyata, Tokyo (JP); Seiki Takahashi, Tokyo (JP); Takayuki Ogasahara, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 18/847,784

(22) PCT Filed: Mar. 7, 2023

(86) PCT No.: PCT/JP2023/008458
§ 371 (c)(1),
(2) Date: Sep. 17, 2024

(87) PCT Pub. No.: WO2023/195286
PCT Pub. Date: Oct. 12, 2023

(65) Prior Publication Data

US 2025/0208393 A1 Jun. 26, 2025

(30) Foreign Application Priority Data

Apr. 4, 2022 (JP) ................................ 2022-062322

(51) Int. Cl.
*G02B 19/00* (2006.01)
*G02B 27/10* (2006.01)
(Continued)

(52) U.S. Cl.
CPC ..... *G02B 19/0076* (2013.01); *G02B 19/0009* (2013.01); *G02B 27/1013* (2013.01);
(Continued)

(58) Field of Classification Search
CPC .......... G01J 1/02; G01J 1/04; G02B 19/0009; G02B 19/0076; G02B 27/1013;
(Continued)

(56) References Cited

U.S. PATENT DOCUMENTS 9,431,443 B1 8/2016 Lenchenkov et al.
2010/0176473 A1 7/2010 Nishiwaki
(Continued)

FOREIGN PATENT DOCUMENTS

JP 2017-063198 3/2017
JP 2019-184986 10/2019
(Continued)

OTHER PUBLICATIONS

English Translation of International Search Report prepared by the Japan Patent Office on May 12, 2023, for International Application No. PCT/JP2023/008458, 3 pgs.

*Primary Examiner* — Amy R Hsu
(74) *Attorney, Agent, or Firm* — SHERIDAN ROSS P.C.

(57) ABSTRACT

A light detection element according to the present disclosure includes a plurality of photoelectric converters, a color splitter layer, and a plurality of condensers. The plurality of photoelectric converters are disposed side by side in a matrix in a semiconductor layer. The color splitter layer is disposed on a light incident side with respect to the plurality of photoelectric converters, and includes a low refractive index layer and a plurality of columnar high refractive index portions. The plurality of condensers are disposed on the
(Continued)

light incident side with respect to the color splitter layer, and condenses incident light to the corresponding high refractive index portions.

11 Claims, 21 Drawing Sheets

(51) Int. Cl.
*H04N 25/13* (2023.01)
*H04N 25/76* (2023.01)

(52) U.S. Cl.
CPC ....... *G02B 27/1066* (2013.01); *H04N 25/134* (2023.01); *H04N 25/76* (2023.01)

(58) Field of Classification Search
CPC .. G02B 27/1066; H05B 33/02; H04N 25/134; H04N 25/76; H10F 39/12; H10F 77/40; H10K 50/00; H10K 59/00
See application file for complete search history.

(56) References Cited

U.S. PATENT DOCUMENTS

| | | | | |
|---|---|---|---|---|
| 2010/0188537 | A1 | 7/2010 | Hiramoto et al. | |
| 2015/0221693 | A1 | 8/2015 | Saitou | |
| 2016/0054172 | A1 | 2/2016 | Roh et al. | |
| 2016/0109716 | A1* | 4/2016 | Sohn | G02B 27/123 359/639 |
| 2016/0351616 | A1 | 12/2016 | Lenchenkov et al. | |
| 2017/0092676 | A1 | 3/2017 | Yun et al. | |
| 2020/0266230 | A1* | 8/2020 | Miyata | H10F 39/8053 |
| 2021/0185251 | A1* | 6/2021 | Yonemoto | H04N 25/709 |
| 2021/0271000 | A1 | 9/2021 | Park et al. | |
| 2021/0280625 | A1* | 9/2021 | Park | H10F 39/024 |

FOREIGN PATENT DOCUMENTS

| | | |
|---|---|---|
| JP | 2021-140152 | 9/2021 |
| WO | WO 2009/019818 | 2/2009 |
| WO | WO 2009/153937 | 12/2009 |
| WO | WO 2014/061173 | 4/2014 |

* cited by examiner

FIG.3

R2
R1
42G
L
$n_{R2}$
$n_{R1}$
X
43b
43a
$\theta$

FIG.17

LIGHT DETECTION ELEMENT AND ELECTRONIC APPARATUS

CROSS REFERENCE TO RELATED APPLICATIONS

This application is a national stage application under 35 U.S.C. 371 and claims the benefit of PCT Application No. PCT/JP2023/008458, having an international filing date of 7 Mar. 2023, which designated the United States, which PCT application claimed the benefit of Japanese Patent Application No. 2022-062322, filed 4 Apr. 2022, the entire disclosures of each of which are incorporated herein by reference.

FIELD

The present disclosure relates to a light detection element and an electronic apparatus.

BACKGROUND

In recent years, electronic apparatuses such as digital cameras have been becoming increasingly popular, and demand for light detection elements such as image sensors, which are main components of the electronic apparatuses, has been increasing. Accordingly, technology development for realizing high image quality and high functionality of light detection elements has been actively performed (refer to Patent Literature 1, for example).

CITATION LIST

Patent Literature

Patent Literature 1: JP 2021-140152 A

SUMMARY

Technical Problem

However, in the above-described conventional technique, there is room for further improvement in terms of improving the sensitivity of light detection elements.

Therefore, the present disclosure proposes a light detection element and an electronic apparatus capable of improving sensitivity.

Solution to Problem

According to the present disclosure, there is provided a light detection element. The light detection element includes a plurality of photoelectric converters, a color splitter layer, and a plurality of condensers. The plurality of photoelectric converters are disposed side by side in a matrix in a semiconductor layer. The color splitter layer is disposed on a light incident side with respect to the plurality of photoelectric converters, and includes a low refractive index layer and a plurality of columnar high refractive index portions. The plurality of condensers are disposed on the light incident side with respect to the color splitter layer, and condenses incident light to the corresponding high refractive index portions.

BRIEF DESCRIPTION OF DRAWINGS

FIG. 3 is a diagram for describing a principle of a color splitter according to an embodiment of the present disclosure.

FIG. 17 is a cross-sectional view schematically illustrating a structure of a pixel array according to a fifth modified example of the embodiment of the present disclosure.

DESCRIPTION OF EMBODIMENTS

Figure 1:
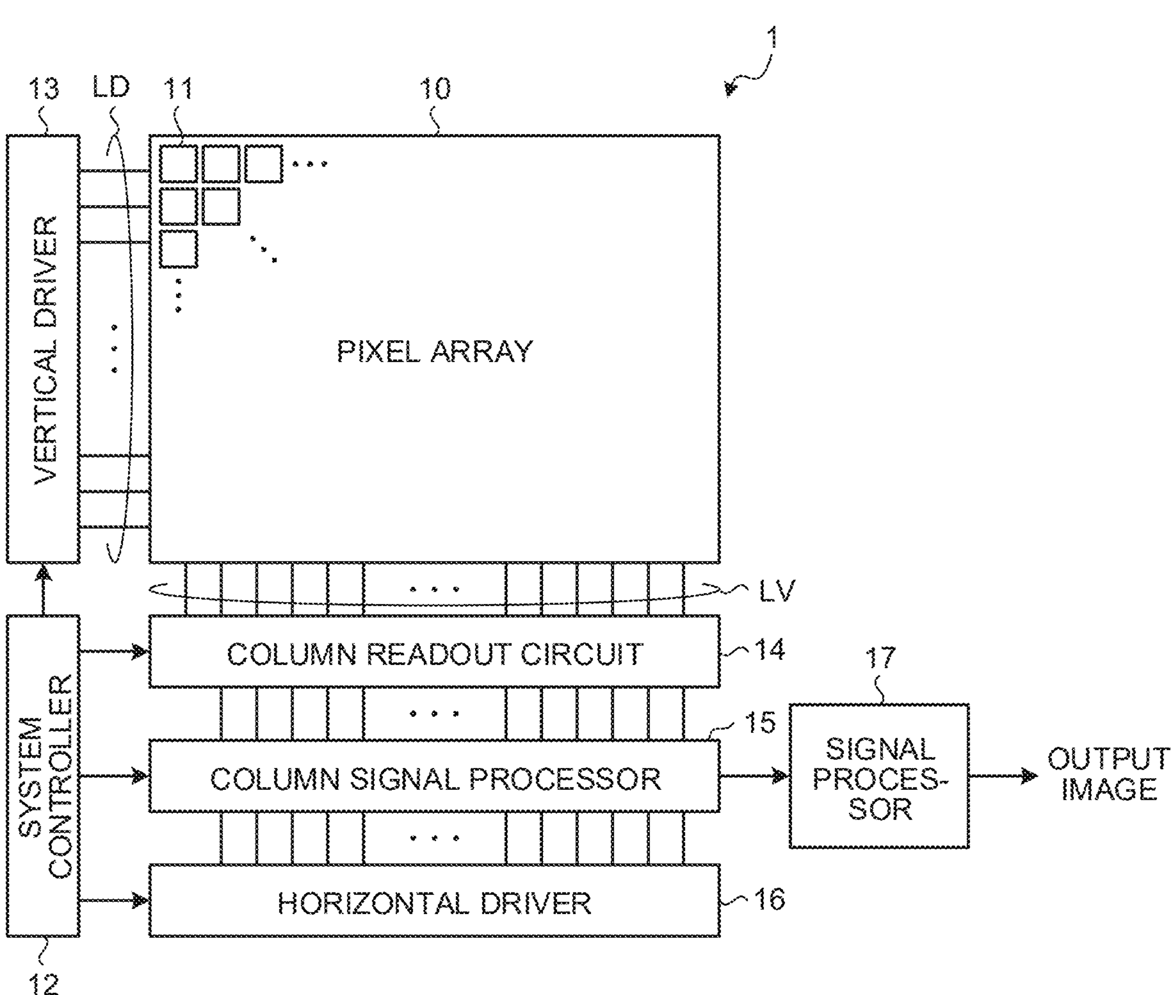
FIG. 1 is a system configuration diagram illustrating a schematic configuration example of a solid-state imaging element according to an embodiment of the present disclosure.

Hereinafter, each embodiment of the present disclosure will be described in detail on the basis of the drawings. In each of the following embodiments, the same parts are denoted by the same reference numerals, and redundant description will be omitted.

In recent years, electronic apparatuses such as digital cameras have been becoming increasingly popular, and demand for light detection elements such as image sensors, which are main components of the electronic apparatuses, has been increasing. Accordingly, technology development for realizing high image quality and high functionality of light detection elements has been actively performed.

For example, the above-described conventional technique discloses a technique of improving the sensitivity of a light detection element by allowing light of a corresponding color to be incident on not only from immediately above but also from an adjacent region using a color splitter having a meta-surface structure.

However, in the above-described conventional technique, the light transmission state inside the color splitter is not necessarily optimized, and thus there is room for further improvement in terms of improving sensitivity.

Therefore, there is a need to realize a technique capable of overcoming the above-described problems and improving the sensitivity of a light detection element.

[Configuration of Solid-State Imaging Element]

FIG. 1 is a system configuration diagram illustrating a schematic configuration example of a solid-state imaging element 1 according to an embodiment of the present disclosure. The solid-state imaging element 1 is an example of a light detection element. Note that a light detection element of the present disclosure is not limited to a solid-state imaging element, and may be various light detection elements such as a single-photon avalanche diode (SPAD) element and an avalanche photo diode (APD) element.

As illustrated in FIG. 1, the solid-state imaging element 1 that is a CMOS image sensor includes a pixel array 10, a system controller 12, a vertical driver 13, a column readout circuit 14, a column signal processor 15, a horizontal driver 16, and a signal processor 17.

The pixel array 10, the system controller 12, the vertical driver 13, the column readout circuit 14, the column signal processor 15, the horizontal driver 16, and the signal processor 17 are provided on the same semiconductor substrate or on a plurality of electrically connected laminated semiconductor substrates.

In the pixel array 10, effective unit pixels 11 each having a photoelectric conversion element (photodiode PD (refer to FIG. 2)) capable of photoelectrically converting a charge amount corresponding to an incident light amount, accumulating the charge amount therein, and outputting the charge amount as a signal are two-dimensionally disposed in a matrix. Note that, in the following description, the effective unit pixel 11 is also referred to as a "unit pixel 11".

Furthermore, the pixel array 10 may include an area in which dummy unit pixels having a structure without photodiodes PD, light-shielding unit pixels in which light incidence from the outside is shielded by shielding a light-receiving surface, and the like are disposed in a row and/or column shape, in addition to the effective unit pixels 11.

Note that the light-shielding unit pixel may have the same configuration as the effective unit pixel 11 except for having a structure in which the light-receiving surface is shielded from light. Furthermore, in the following description, photocharge of a charge amount corresponding to an incident light amount is also simply referred to as "charge", and the unit pixel 11 is also simply referred to as a "pixel".

In the pixel array 10, a pixel drive line LD is formed for each row along the left-right direction in the figure (direction in which pixels are arranged in pixel rows) with respect to the pixel array in a matrix, and a vertical pixel wire LV is formed for each column along the up-down direction in the figure (direction in which pixels are arranged in pixel columns). One end of the pixel drive line LD is connected to an output terminal corresponding to each row of the vertical driver 13.

The column readout circuit 14 includes at least a circuit that supplies a constant current to the unit pixels 11 in a selected row in the pixel array 10 for each column, a current mirror circuit, a changeover switch of a unit pixel 11 to be read, and the like.

In addition, the column readout circuit 14 configures an amplifier along with a transistor in a selected pixel in the pixel array 10, converts a photocharge signal into a voltage signal, and outputs the voltage signal to the vertical pixel wire LV.

The vertical driver 13 includes a shift register, an address decoder, and the like, and drives each unit pixel 11 of the pixel array 10 at the same time for all pixels or row by row, or the like. Although a specific configuration of the vertical driver 13 is not illustrated, the vertical driver has a configuration including a read scanning system and a sweep scanning system or a batch sweep and batch transfer system.

In order to read a pixel signal from the unit pixel 11, the read scanning system sequentially selects and scans the unit pixels 11 of the pixel array 10 row by row. In the case of row driving (rolling shutter operation), with respect to sweeping, sweep scanning is performed on a read row on which read scanning is performed by the read scanning system prior to read scanning by a time corresponding to a shutter speed.

In addition, in the case of global exposure (global shutter operation), batch sweeping is performed prior to batch transfer by the time of a shutter speed. By such sweeping, unnecessary charges are swept (reset) from photodiodes PD and the like of the unit pixels 11 in the read row. Then, so-called electronic shutter operation is performed by sweeping (resetting) unnecessary charges.

Here, the electronic shutter operation refers to an operation of discarding unnecessary photocharges accumulated in the photodiodes PD or the like until immediately before and newly starting exposure (starting accumulation of photocharges).

A signal read by the read operation performed by the read scanning system corresponds to the amount of light incident after the immediately preceding read operation or electronic shutter operation. In the case of row driving, a period from the read timing of the immediately preceding read operation or the sweep timing of the electronic shutter operation to the read timing of the current read operation is a photocharge accumulation time (exposure time) in the unit pixel 11. In the case of global exposure, a time from batch sweeping to batch transfer is an accumulation time (exposure time).

A pixel signal output from each unit pixel 11 of a pixel row selectively scanned by the vertical driver 13 is supplied to the column signal processor 15 through each of the vertical pixel wires LV. The column signal processor 15 performs predetermined signal processing on the pixel signal output from each unit pixel 11 of the selected row through the vertical pixel wire LV for each pixel column of the pixel array 10, and temporarily holds the pixel signal after signal processing.

Specifically, the column signal processor 15 performs at least noise removal processing, for example, correlated double sampling (CDS) processing as signal processing. According to CDS processing performed by the column signal processor 15, fixed pattern noise specific to pixels such as reset noise and threshold variation of an amplification transistor AMP is removed.

Note that the column signal processor 15 can be configured to have, for example, an AD conversion function in addition to noise removal processing and output a pixel signal as a digital signal.

The horizontal driver 16 includes a shift register, an address decoder, and the like, and sequentially selects unit circuits corresponding to the pixel columns of the column signal processor 15. According to selective scanning performed by the horizontal driver 16, pixel signals subjected to signal processing by the column signal processor 15 are sequentially output to the signal processor 17.

The system controller 12 includes a timing generator that generates various timing signals and the like, and controls driving of the vertical driver 13, the column signal processor 15, the horizontal driver 16, and the like on the basis of various timing signals generated by the timing generator.

The solid-state imaging element 1 further includes the signal processor 17 and a data storage that is not illustrated. The signal processor 17 has at least an addition processing function, and performs various types of signal processing such as addition processing on pixel signals output from the column signal processor 15.

The data storage temporarily stores data necessary for signal processing in the signal processor 17. The signal processor 17 and the data storage may be external signal processors provided on a substrate different from the solid-state imaging element 1, for example, a digital signal processor (DSP) or software, or may be mounted on the same substrate as the solid-state imaging element 1.

[Configuration of Pixel Array]

Next, a detailed configuration of the pixel array 10 will be described with reference to FIG. 2 to FIG. 7.

Figure 2:
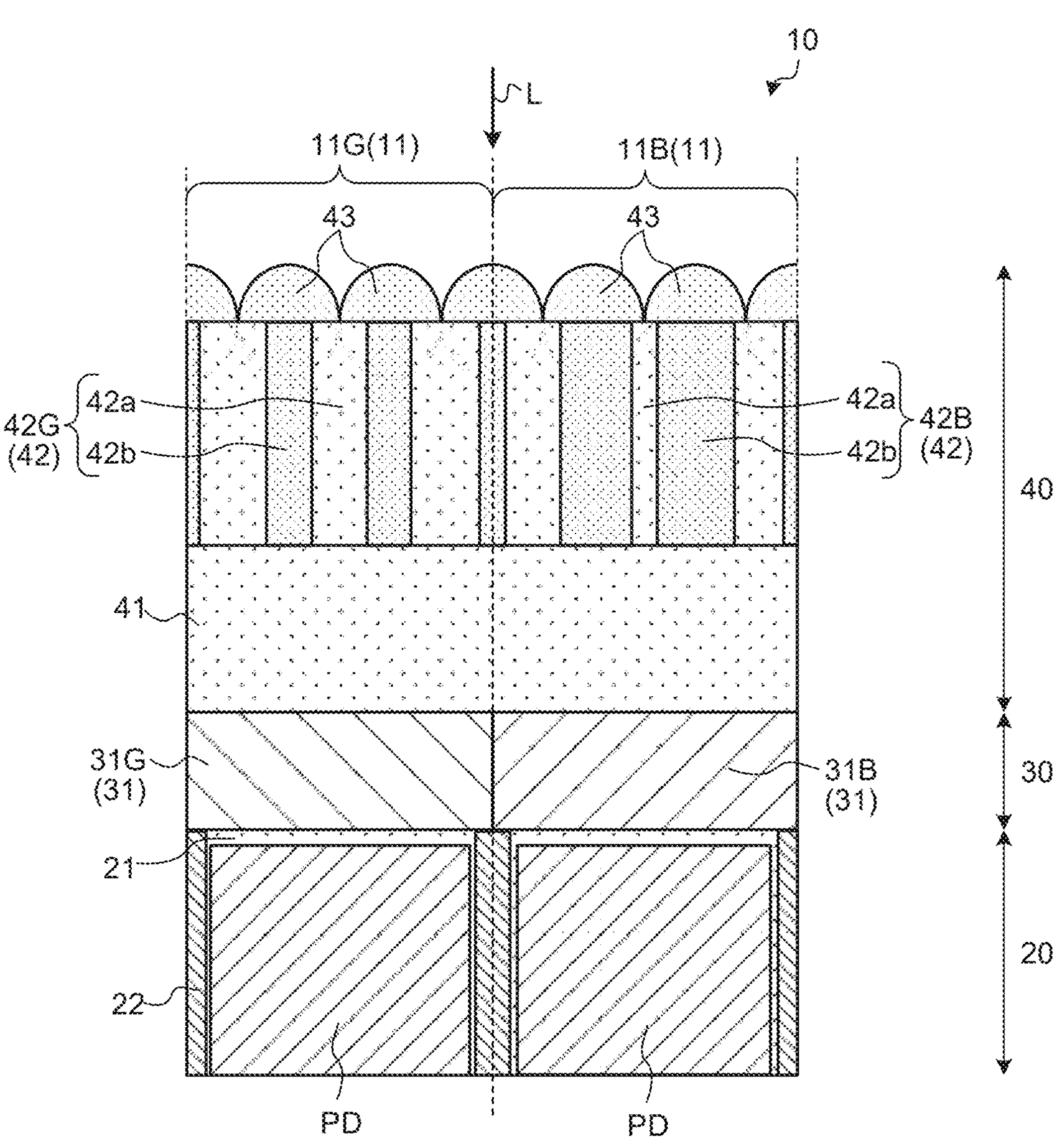
FIG. 2 is a cross-sectional view schematically illustrating a structure of a pixel array according to an embodiment of the present disclosure.

FIG. 2 is a cross-sectional view schematically illustrating a structure of the pixel array 10 according to an embodiment of the present disclosure. Note that, in the present disclosure, description will be given using a cross-sectional view in which a pixel 11G that receives green light and a pixel 11B that receives blue light are located in the pixel array 10, but a pixel (not illustrated) that receives red light also has a configuration similar to that of the pixel 11G and the pixel 11B.

As illustrated in FIG. 2, the pixel array 10 includes a semiconductor layer 20, a color filter layer 30, and a spectral layer 40. In addition, in the pixel array 10, the spectral layer 40, the color filter layer 30, and the semiconductor layer 20 are stacked in this order from a side (hereinafter, also referred to as a light incident side) on which incident light L from the outside is incident.

The semiconductor layer 20 includes a semiconductor region (not illustrated) of a first conductivity type (for example, P-type) and a plurality of semiconductor regions (not illustrated) of a second conductivity type (for example, N-type). In addition, in the semiconductor region of the first conductivity type, the plurality of semiconductor regions of the second conductivity type are formed side by side in a plane direction (direction in which the pixels 11 are arranged) in units of pixels, and thus a plurality of photodiodes PD according to PN junction are formed side by side.

An insulating film 21 is disposed on a surface of the semiconductor layer 20 on the light incident side. The insulating film 21 includes, for example, a fixed charge film.

Furthermore, a separator 22 that optically and electrically separates adjacent photodiodes PD from each other is provided between the adjacent photodiodes PD. The separator 22 is provided inside the semiconductor layer 20 to surround the photodiode PD in plan view.

Note that a wiring layer that is not illustrated is disposed on a surface of the semiconductor layer 20 opposite to the light incident side. Such a wiring layer is configured by forming a plurality of wiring films (not illustrated) and a plurality of pixel transistors (not illustrated) in an interlayer insulating film (not illustrated). The plurality of pixel transistors perform reading of charges accumulated in the plurality of photodiodes PD, and the like.

The color filter layer 30 is disposed on the surface of the semiconductor layer 20 on the light incident side. A plurality of color filters 31 are disposed in the color filter layer 30.

The color filters 31 are optical filters that transmit light in a predetermined wavelength range in the incident light L. The color filters 31 include, for example, a color filter 31G that transmits green light, a color filter 31B that transmits blue light, and a color filter (not illustrated) that transmits red light.

The spectral layer 40 is disposed on a surface of the color filter layer 30 on the light incident side. The spectral layer 40 includes an intermediate layer 41, a color splitter layer 42, and a plurality of condensers 43. In addition, in the spectral layer 40, the plurality of condensers 43, the color splitter layer 42, and the intermediate layer 41 are stacked in this order from the light incident side.

The intermediate layer 41 is a layer for adjusting a focal length between the color splitter layer 42 and the photodiode PD. As will be described later, the intermediate layer 41 is provided to secure a distance necessary to allow red light, green light, and blue light dispersed in different directions in the color splitter layer 42 to be incident on a desired photodiode PD.

The intermediate layer 41 is made of, for example, a material having a low refractive index. The intermediate layer 41 is made of, for example, a metal oxide such as silicon oxide or aluminum oxide, or an organic substance such as an acrylic resin.

The color splitter layer 42 includes a low refractive index layer 42*a* and a plurality of high refractive index portions 42*b*. The low refractive index layer 42*a* is made of a material having a refractive index lower than that of the high refractive index portions 42*b*. The low refractive index layer 42*a* is made of, for example, a metal oxide such as silicon oxide or aluminum oxide, or an organic substance such as an acrylic resin.

The high refractive index portions 42*b* having a predetermined shape (for example, a column shape) are provided inside the low refractive index layer 42*a*. The high refractive index portions 42*b* are made of a material having a refractive index higher than that of the low refractive index layer 42*a*.

The high refractive index portions 42*b* are made of, for example, a silicon compound such as silicon nitride or silicon carbide, a metal oxide such as titanium oxide, tantalum oxide, niobium oxide, hafnium oxide, indium oxide, or tin oxide, or a composite oxide thereof. Further, the high refractive index portions 42*b* may be made of an organic substance such as siloxane.

In the color splitter layer 42, a plurality of color splitters 42G and 42B including the high refractive index portions 42*b* and the low refractive index layer 42*a* adjacent to the high refractive index portions 42*b* are disposed.

The color splitter 42G is disposed on the light incident side of the photodiode PD in the pixel 11G. The color splitter 42B is disposed on the light incident side of the photodiode PD in the pixel 11B. Furthermore, although not illustrated, a color splitter corresponding to red light is disposed on the light incident side of the photodiode PD in the pixel 11 that receives red light.

Figure 3:
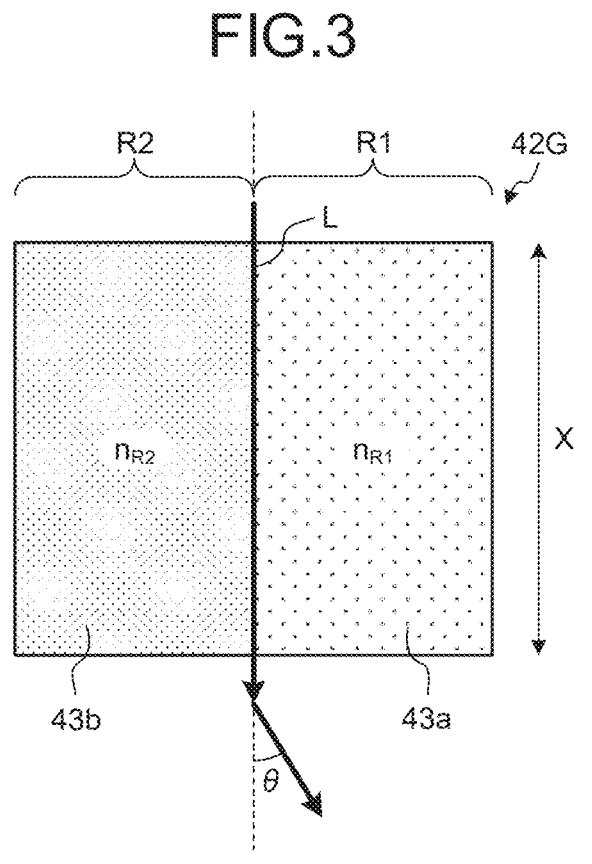

Here, the principle of the color splitter 42G and the like according to the embodiment will be described with reference to FIG. 3. FIG. 3 is a diagram for describing the principle of the color splitter 42G and the like according to the embodiment of the present disclosure.

As illustrated in FIG. 3, a first region R1 in which the low refractive index layer 42*a* is located and a second region R2 in which the high refractive index portion 42*b* is located are disposed in the color splitter 42G or the like.

Specifically, in the first region R1, the low refractive index layer 42*a* having a low refractive index (for example, refractive index $n_{R1}$) is disposed in a light incident direction by a length X. Further, in the second region R2, the high refractive index portion 42*b* having a high refractive index (for example, refractive index $n_{R2}$) is disposed in the light incident direction by the length X.

In the color splitter 42G or the like having such a configuration, when incident light L is simultaneously incident on the first region R1 and the second region R2, a difference in the traveling distance of the incident light L occurs between the first region R1 and the second region R2 due to the refractive index difference between the low refractive index layer 42*a* and the high refractive index portion 42*b*.

Specifically, the optical path length D1 of the first region R1 is obtained by the following formula (1).

$$D1 = n_{R1} \times X \tag{1}$$

In addition, the optical path length D2 of the second region R2 is obtained by the following formula (2).

$$D2 = n_{R2} \times X \tag{2}$$

On the basis of the formulas (1) and (2), the optical path length difference ΔD between the first region R1 and the second region R2 is obtained by the following formula (3).

$$\Delta D = D2 - D1 = X \times (n_{R2} - n_{R1}) \tag{3}$$

Then, the incident light L that has passed through the color splitter 42G and the like is bent toward the first region R1 where the light advances with a delay and emitted as illustrated in FIG. 3 due to the optical path length difference ΔD between the first region R1 and the second region R2.

The bending angle θ of the incident light L is obtained by the following formula (4).

$$\theta = \arctan(\Delta D/\lambda) = \arctan(X \times (n_{R2} - n_{R1})/\lambda) \tag{4}$$

$\lambda$: wavelength of incident light $L$

As represented by the above formula (4), the bending angle θ of the incident light L depends on the wavelength λ of the incident light L. Therefore, by appropriately selecting the refractive indexes $n_{R1}$ and $n_{R2}$ of the low refractive index layer 42*a* and the high refractive index portion 42*b* in accordance with the respective wavelength ranges, the color splitter 42G or the like can bend light in the respective wavelength ranges in different desired directions.

Figure 4:
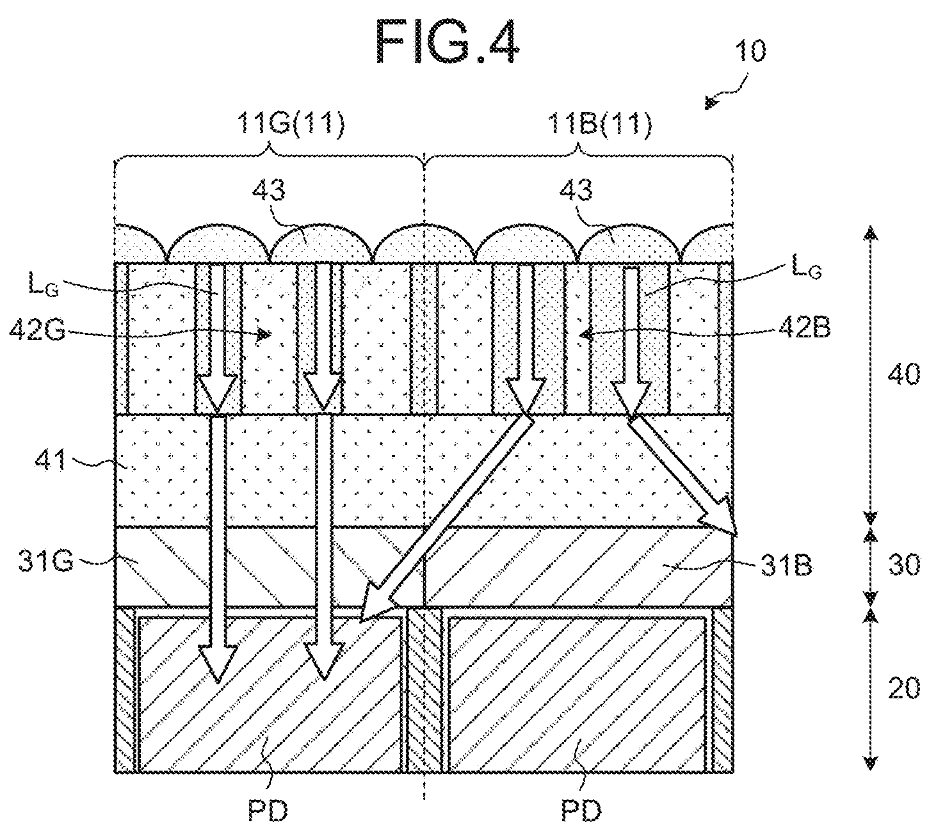
FIG. 4 is a diagram illustrating an incident state of incident light in the pixel array according to the embodiment of the present disclosure.

FIG. 4 is a diagram illustrating an incident state of incident light L in the pixel array 10 according to the embodiment of the present disclosure, and is a diagram illustrating an incident state of green light $L_G$ among the incident light L in the cross-sectional configuration illustrated in FIG. 2.

As illustrated in FIG. 4, among the incident light L, the green light $L_G$ is hardly bent by the color splitter 42G and is directly incident on the photodiode PD located below the color splitter 42G. On the other hand, the green light $L_G$ is greatly bent in the color splitter 42B and is incident on a photodiode PD adjacent to the photodiode PD below the color splitter 42B.

Figure 5:
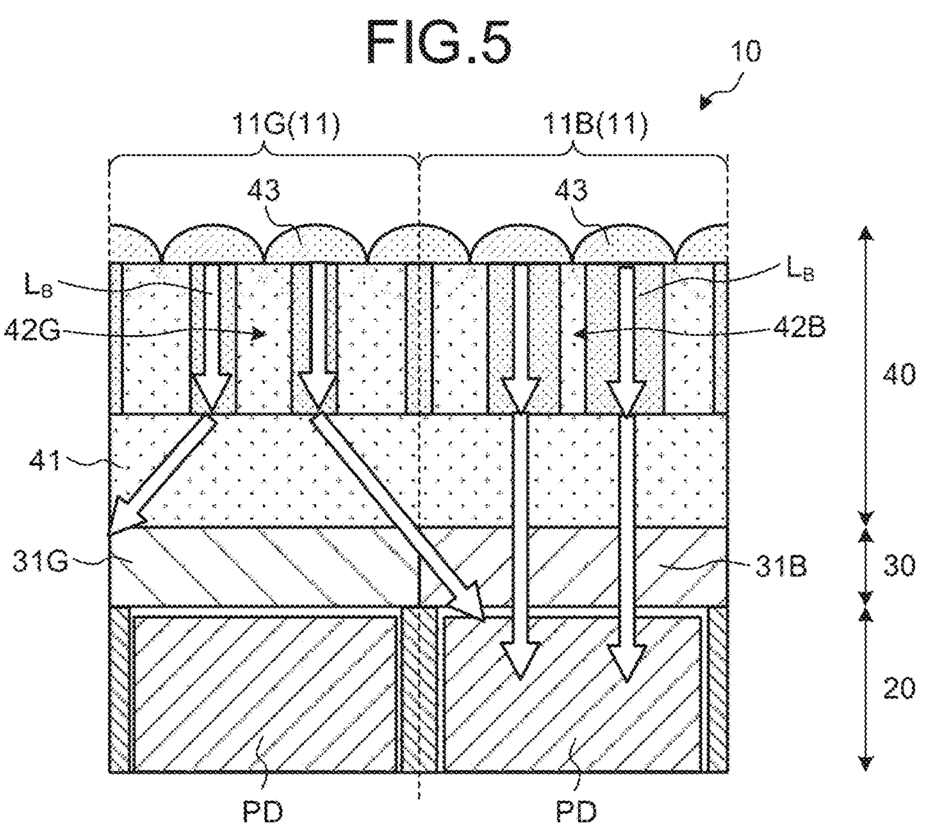
FIG. 5 is a diagram illustrating an incident state of incident light in the pixel array according to the embodiment of the present disclosure.

FIG. 5 is a diagram illustrating an incident state of the incident light L in the pixel array 10 according to the embodiment of the present disclosure, and is a diagram illustrating an incident state of blue light LB among the incident light L in the cross-sectional configuration illustrated in FIG. 2.

As illustrated in FIG. 5, among the incident light L, the blue light LB is hardly bent by the color splitter 42B and is directly incident on the photodiode PD located below the color splitter 42B. On the other hand, the blue light LB is greatly bent at the color splitter 42G and is incident on a photodiode PD adjacent to the photodiode PD below the color splitter 42G.

As described above, in the embodiment, by disposing the color splitters 42G and 42B having a meta-surface structure on the light incident side of the photodiode PD, light of a corresponding color can be incident not only from immediately above but also from an adjacent region. Therefore, according to the embodiment, the sensitivity of the solid-state imaging element 1 can be improved.

Note that, although not illustrated, red light among the incident light L can also be incident on the photodiode PD for red light not only from immediately above but also from an adjacent region by forming a color splitter having a meta-surface structure in the color splitter layer 42.

Furthermore, the "meta-surface structure" is a structure in which a plurality of columnar portions (high refractive index portions 42*b*) formed in the color splitter 42G and the like are arranged with a period equal to or less than the wavelength λ of the incident light L.

With such a structure, since the effective refractive index of the color splitter 42G or the like can be changed, red light, green light, and blue light having different wavelength ranges can be further bent in desired directions.

Furthermore, in the embodiment, by disposing the color filter 31 between the photodiode PD and the color splitter 42G or the like, even in a case where light different from a corresponding color is incident, such light can be curbed from being photoelectrically converted. Therefore, according to the embodiment, color mixing of the solid-state imaging element 1 can be curbed.

The description returns to FIG. 2. A plurality of condensers 43 are disposed on a surface of the color splitter layer 42 on the light incident side. The condensers 43 are formed in, for example, a hemispherical shape, and one condenser is provided for each high refractive index portion 42*b* of the color splitter layer 42.

The condenser 43 is, for example, a lens that condenses the incident light L on each high refractive index portion 42*b*. The condenser 43 is made of, for example, a silicon compound such as silicon nitride or silicon carbide, a metal oxide such as titanium oxide, tantalum oxide, niobium oxide, hafnium oxide, indium oxide, or tin oxide, or a composite oxide thereof. Further, the high refractive index portions 42*b* may be made of an organic substance such as siloxane.

In addition, in the embodiment, by providing the condenser 43 that condenses the incident light L to each high refractive index portion 42*b*, the sensitivity of the pixel array 10 can be improved. The reason will be described with reference to FIG. 6 and FIG. 7.

Figure 6:
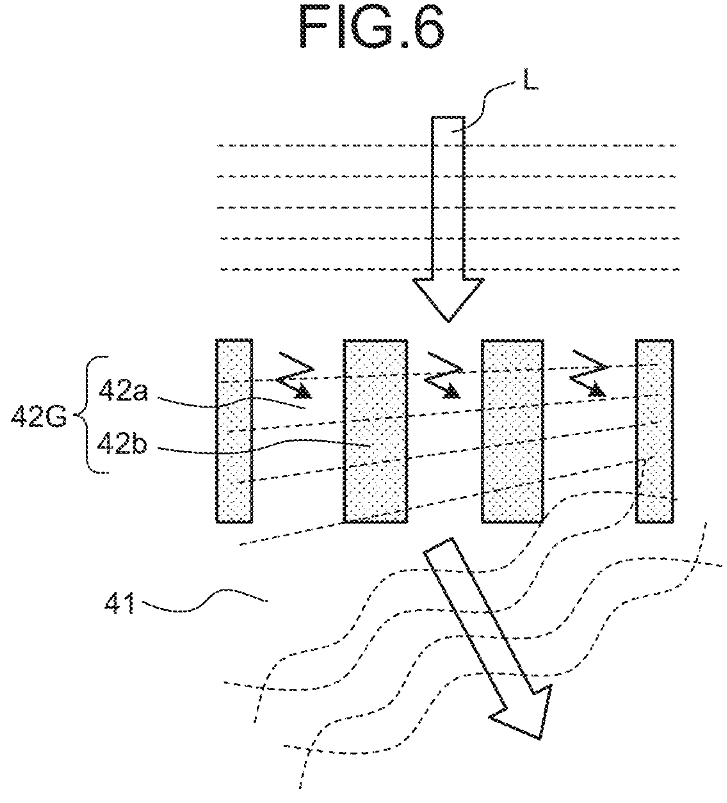
FIG. 6 is a diagram for describing a state of incident light on a color splitter and surroundings thereof in a reference example of the present disclosure.
Figure 7:
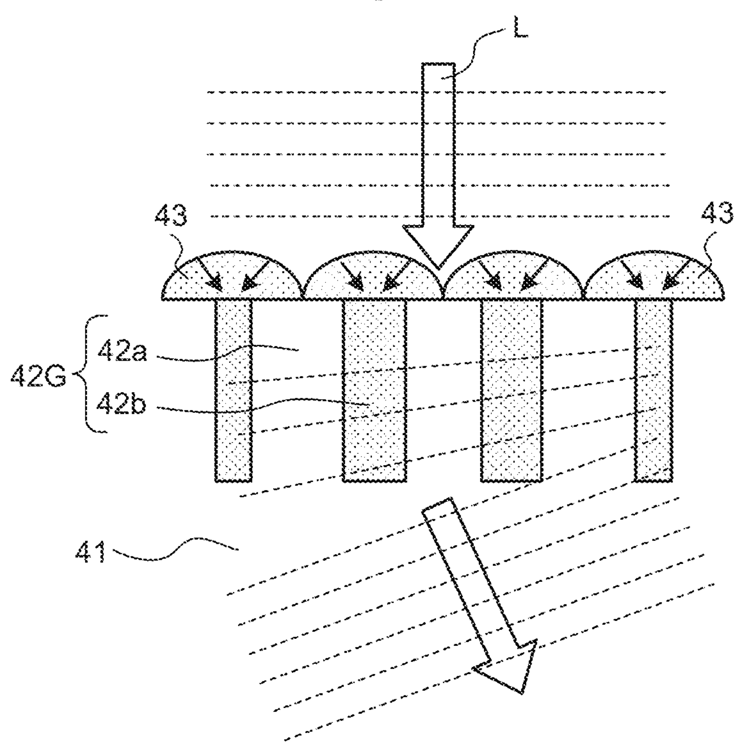
FIG. 7 is a diagram for describing a state of incident light on a color splitter and surroundings thereof according to an embodiment of the present disclosure.

FIG. 6 is a diagram for describing a state of incident light L on the color splitter 42G and surroundings thereof in a reference example of the present disclosure, and FIG. 7 is a diagram for describing a state of the incident light L on the color splitter 42G and surroundings thereof according to the embodiment of the present disclosure. Note that in the reference example illustrated in FIG. 6, the condenser 43 is not provided.

As illustrated in FIG. 6, when incident on the color splitter 42G, the incident light L is incident as plane waves. Here, in the reference example, since light is incident on the low refractive index layer 42*a* in addition to the plurality of high refractive index portions 42*b*, the amount of phase delay is shifted by the light incident on the low refractive index layer 42*a*. Therefore, as illustrated in FIG. 6, after being emitted from the color splitter 42G, the waves of the incident light L are disturbed.

Then, in a state where the waves of the incident light L are disturbed, desired spectral characteristics cannot be sufficiently obtained, and thus there is a possibility that the light from an adjacent region is not sufficiently incident on the photodiode PD. Therefore, in the reference example, the sensitivity improvement effect according to the color splitter 42G and the like may not be sufficiently obtained.

On the other hand, in the embodiment, it is possible to curb the light from being incident on the low refractive index layer 42*a* in the color splitter layer 42 by providing the condenser 43 that condenses the incident light L in each high refractive index portion 42*b*, as illustrated in FIG. 7.

As a result, since the phase of the light can be aligned inside the color splitter 42G, the state of plane waves can be maintained even after the light is emitted from the color splitter 42G. That is, in the embodiment, desired spectral characteristics can be sufficiently obtained, and thus light from an adjacent region can be sufficiently incident on the photodiode PD.

Therefore, according to the embodiment, the sensitivity of the pixel array 10 can be improved.

Further, in the embodiment, the condenser 43 may be disposed to cover the corresponding high refractive index portion 42*b* from the light incident side, as illustrated in FIG. 2. As a result, the incident light L can be efficiently incident on the high refractive index portion 42*b*, and thus the sensitivity of the pixel array 10 can be further improved.

In the embodiment, the condenser 43 may be disposed to be in contact with the corresponding high refractive index portion 42*b*, as illustrated in FIG. 2. As a result, the incident light L can be efficiently incident on the high refractive index portion 42*b*, and thus the sensitivity of the pixel array 10 can be further improved.

Further, in the embodiment, the condenser 43 may be made of the same material as the high refractive index portion 42*b*. As a result, when the condenser 43 is in contact with the corresponding high refractive index portion 42*b*, it is possible to curb a reflection phenomenon at the interface therebetween.

Therefore, according to the embodiment, since the incident light L can be efficiently incident on the high refractive index portion 42*b*, the sensitivity of the pixel array 10 can be further improved.

Furthermore, in the embodiment, the plurality of condensers 43 may be disposed to cover the color splitter layer 42 without any gap, as illustrated in FIG. 2. As a result, it is possible to further curb light from being incident on the low refractive index layer 42*a*.

Therefore, according to the embodiment, since the state of plane waves can be maintained satisfactorily even after being emitted from the color splitter 42G or the like, the sensitivity of the pixel array 10 can be further improved.

Figure 8:
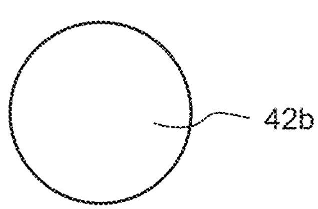
FIG. 8 is a plan view illustrating a shape of a high refractive index portion according to an embodiment of the present disclosure.
Figure 9:
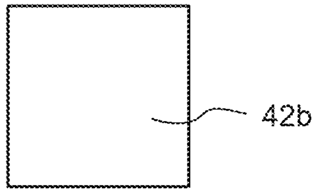
FIG. 9 is a plan view illustrating a shape of a high refractive index portion according to an embodiment of the present disclosure.
Figure 10:
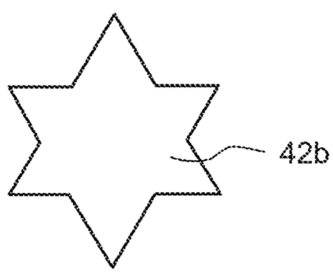
FIG. 10 is a plan view illustrating a shape of a high refractive index portion according to an embodiment of the present disclosure.

Further, in the embodiment, the condenser may have a hemispherical shape protruding upward. As a result, the incident light L can be efficiently incident on the high refractive index portion 42*b*, and thus the sensitivity of the pixel array 10 can be further improved. Note that the high refractive index portion 42*b* according to the embodiment may have a circular shape in plan view as illustrated in FIG. 8, may have a rectangular shape in plan view as illustrated in FIG. 9, or may have a star shape in plan view as illustrated in FIG. 10.

Figure 11:
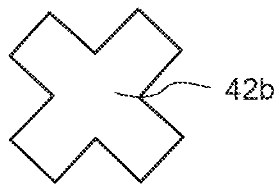
FIG. 11 is a plan view illustrating a shape of a high refractive index portion according to an embodiment of the present disclosure.
Figure 12:
FIG. 12 is a plan view illustrating a shape of a high refractive index portion according to an embodiment of the present disclosure.

In addition, the high refractive index portion 42*b* according to the embodiment may have a substantially X-shape in plan view as illustrated in FIG. 11, or may have a triangular shape in plan view as illustrated in FIG. 12. FIG. 8 to FIG. 12 are plan views illustrating shapes of the high refractive index portion 42*b* according to the embodiment of the present disclosure.

Furthermore, although not illustrated in FIG. 2, a stopper film may be disposed between the intermediate layer 41 and the color splitter layer 42 in the pixel array 10 according to the embodiment. Such a stopper film serves as an etching stopper when a concave portion corresponding to the high refractive index portion 42*b* in a columnar shape is formed inside the low refractive index layer 42*a* in the process of forming the color splitter layer 42.

The stopper film is made of, for example, a silicon compound such as silicon nitride or silicon carbide, a metal oxide such as titanium oxide, tantalum oxide, niobium oxide, hafnium oxide, indium oxide, or tin oxide, or a composite oxide thereof.

VARIOUS MODIFIED EXAMPLES

First Modified Example

Figure 13:
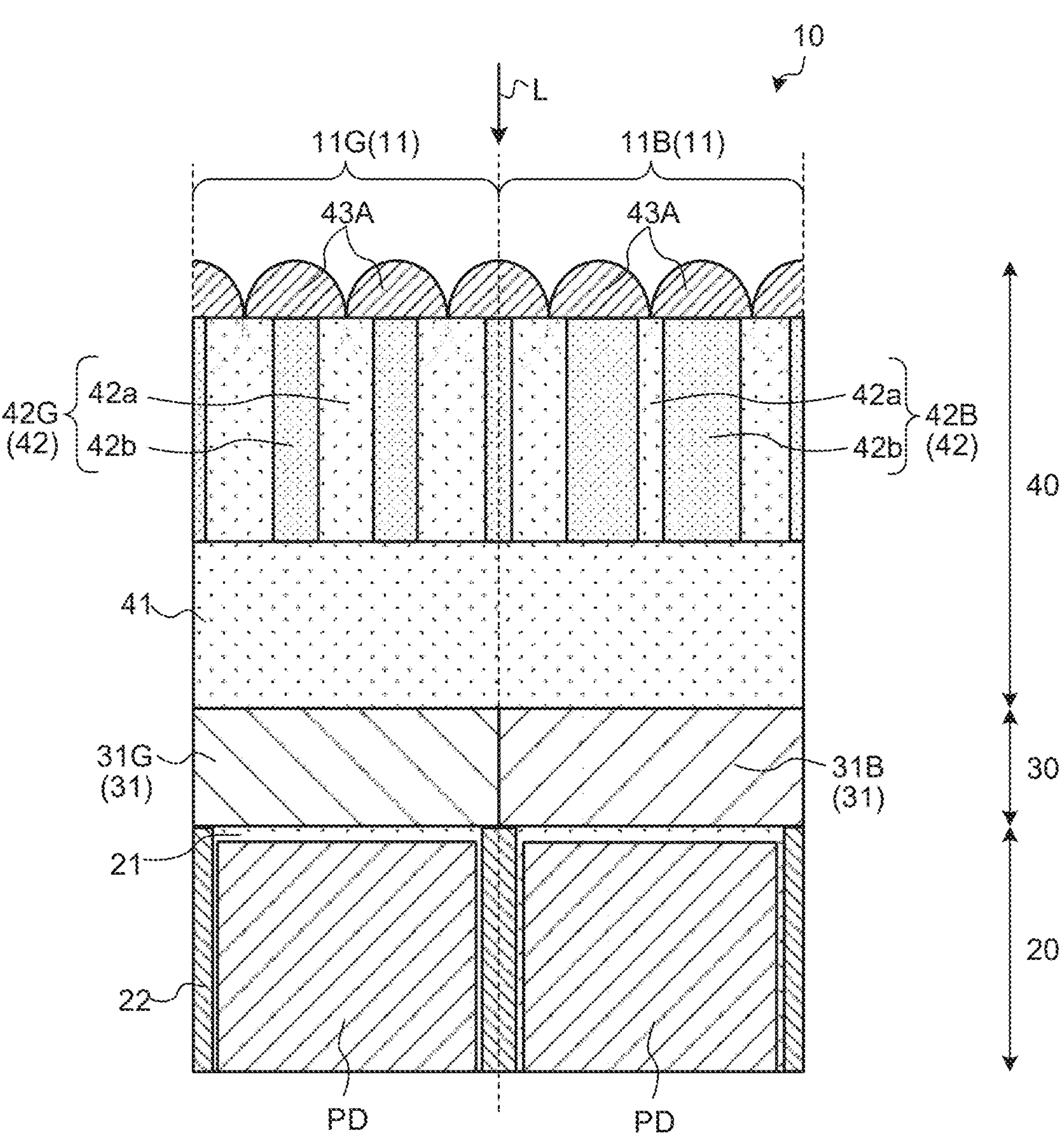
FIG. 13 is a cross-sectional view schematically illustrating a structure of a pixel array according to a first modified example of an embodiment of the present disclosure.

Next, various modified examples of the pixel array 10 according to the embodiment of the present disclosure will be described with reference to FIG. 13 to FIG. 24. FIG. 13 is a cross-sectional view schematically illustrating a structure of the pixel array 10 according to a first modified example of the embodiment of the present disclosure, and is a diagram corresponding to FIG. 2 of the embodiment.

In the pixel array 10 according to the first modified example, the configuration of the condenser 43 is different from that of the above-described embodiment. Specifically, in the first modified example, a condenser 43A made of a material different from that of the high refractive index portion 42*b* of the color splitter layer 42 is disposed at the same position as the condenser 43 of the embodiment. For example, in the first modified example, the condenser 43A is made of a material having a refractive index different from those of the low refractive index layer 42*a* and the high refractive index portion 42*b* of the color splitter layer 42.

Accordingly, by providing the condenser 43A that condenses the incident light L to each high refractive index portion 42*b*, it is possible to curb the light from being incident on the low refractive index layer 42*a*.

As a result, since the phase of the light can be aligned inside the color splitter 42G or the like, the state of plane waves can be maintained even after the light is emitted from the color splitter 42G or the like. That is, in the first modified example, since desired spectral characteristics can be sufficiently obtained, light from an adjacent region can be sufficiently incident on the photodiode PD.

Therefore, according to the first modified example, the sensitivity of the pixel array 10 can be improved.

Second to Fourth Modified Examples

Figure 14:
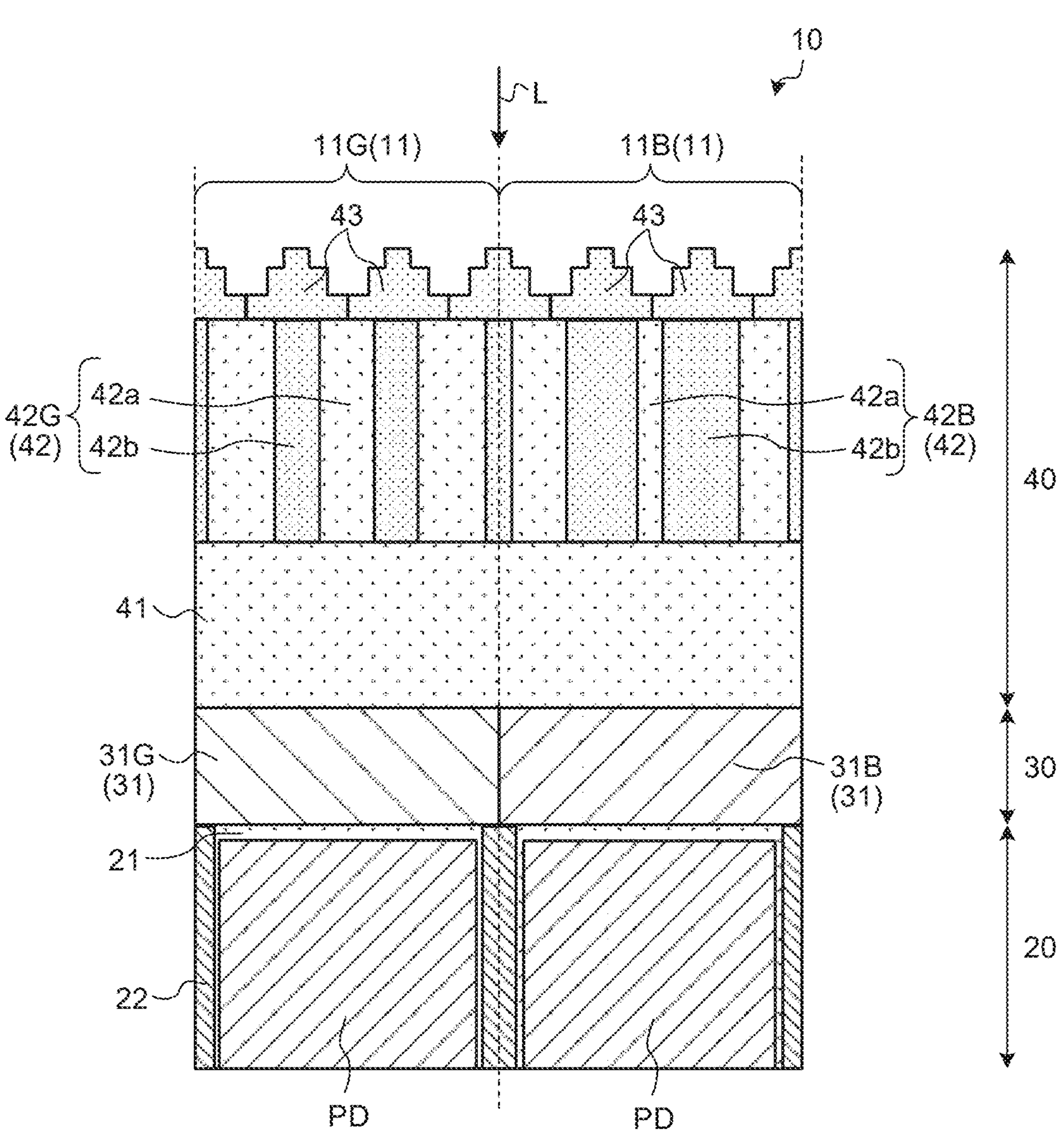
FIG. 14 is a cross-sectional view schematically illustrating a structure of a pixel array according to a second modified example of the embodiment of the present disclosure.
Figure 15:
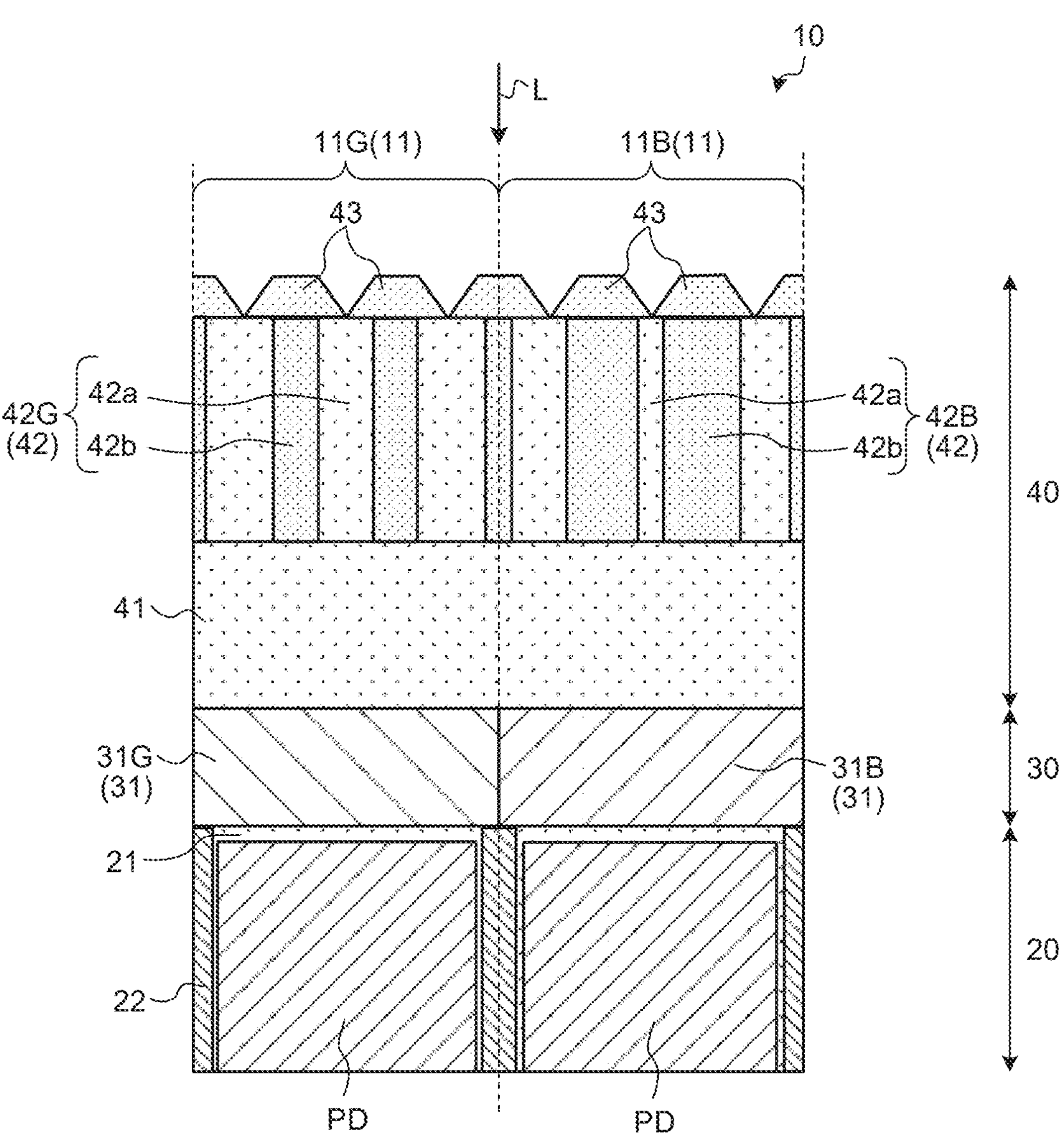
FIG. 15 is a cross-sectional view schematically illustrating a structure of a pixel array according to a third modified example of the embodiment of the present disclosure.
Figure 16:
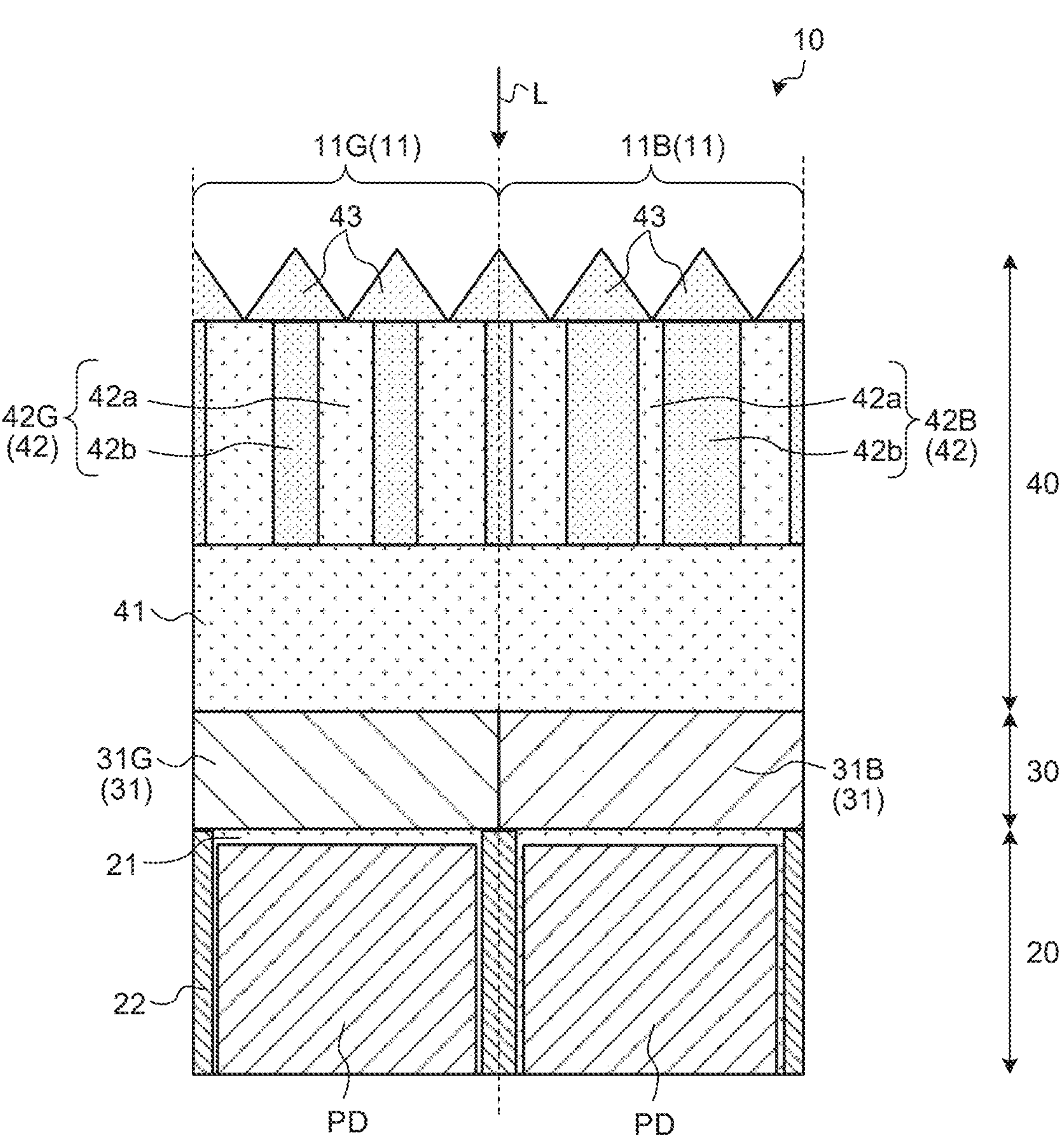
FIG. 16 is a cross-sectional view schematically illustrating a structure of a pixel array according to a fourth modified example of the embodiment of the present disclosure.

FIG. 14 to FIG. 16 are cross-sectional views schematically illustrating structures of the pixel array 10 according to second to fourth modified examples of the embodiment of the present disclosure. In the pixel array 10 according to the second modified example, the configuration of the condenser 43 is different from that of the above-described embodiment.

Specifically, in the second modified example, the condenser 43 has a shape that narrows stepwise toward the light incident side in cross-sectional view instead of a hemispherical shape, as illustrated in FIG. 14. Even with such a shape, the condenser 43 is formed such that the refractive index spatially changes in the traveling direction of the incident light L, and thus it is possible to curb the light from being incident on the low refractive index layer 42*a*.

As a result, since the phase of the light can be aligned inside the color splitter 42G or the like, the state of plane waves can be maintained even after the light is emitted from the color splitter 42G or the like. That is, in the second modified example, since desired spectral characteristics can be sufficiently obtained, light from an adjacent region can be sufficiently incident on the photodiode PD.

Therefore, according to the second modified example, the sensitivity of the pixel array 10 can be improved.

Note that the cross-sectional shape of the condenser 43 in the present disclosure is not limited to the examples of FIG. 2 and FIG. 14, and may be, for example, a trapezoidal shape in which the light incident side is a short side as illustrated in FIG. 15, or a triangular shape having one vertex on the light incident side as illustrated in FIG. 16. This also makes it possible to improve the sensitivity of the pixel array 10.

Fifth to Seventh Modified Examples

Figure 17:
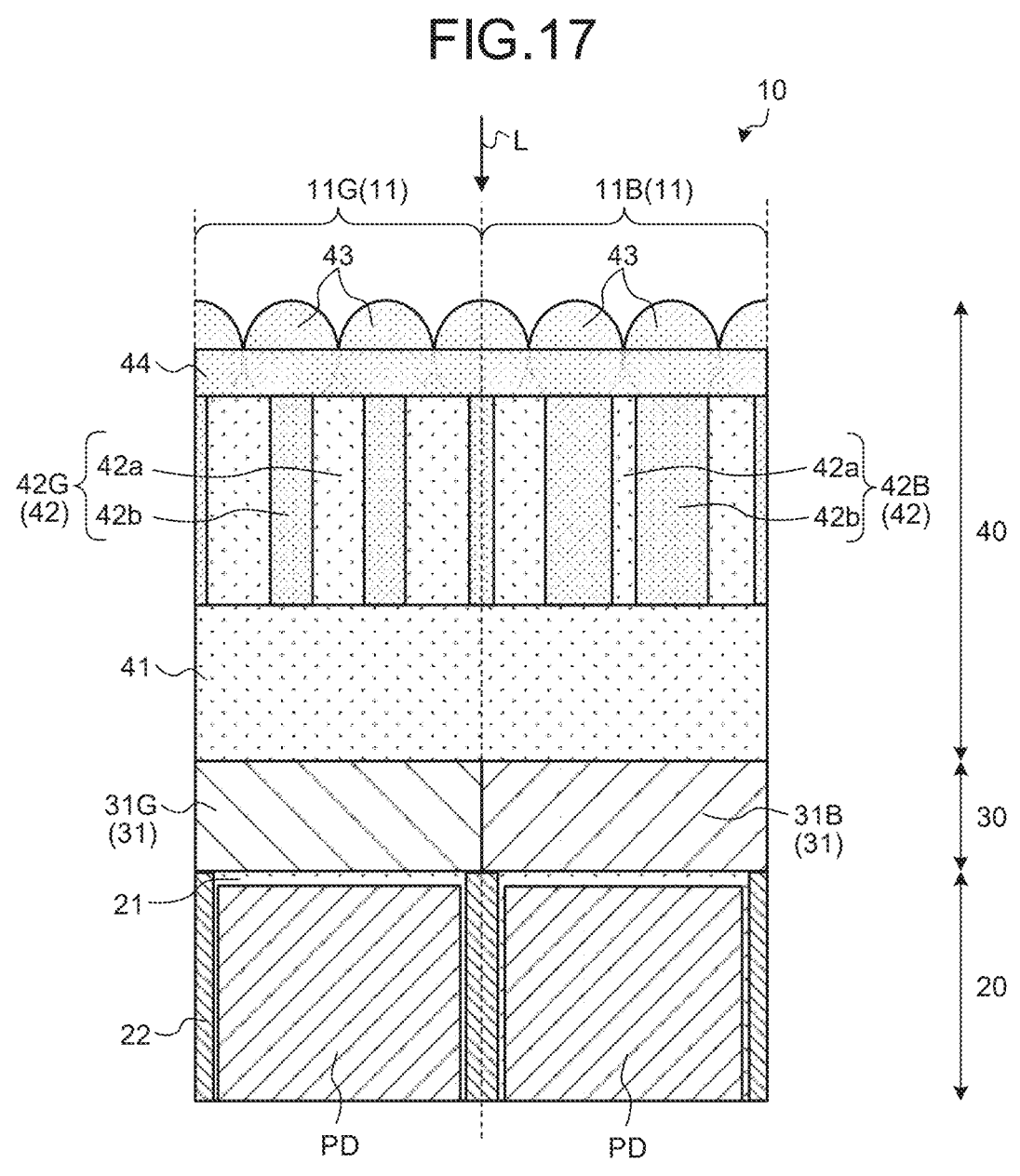
Figure 18:
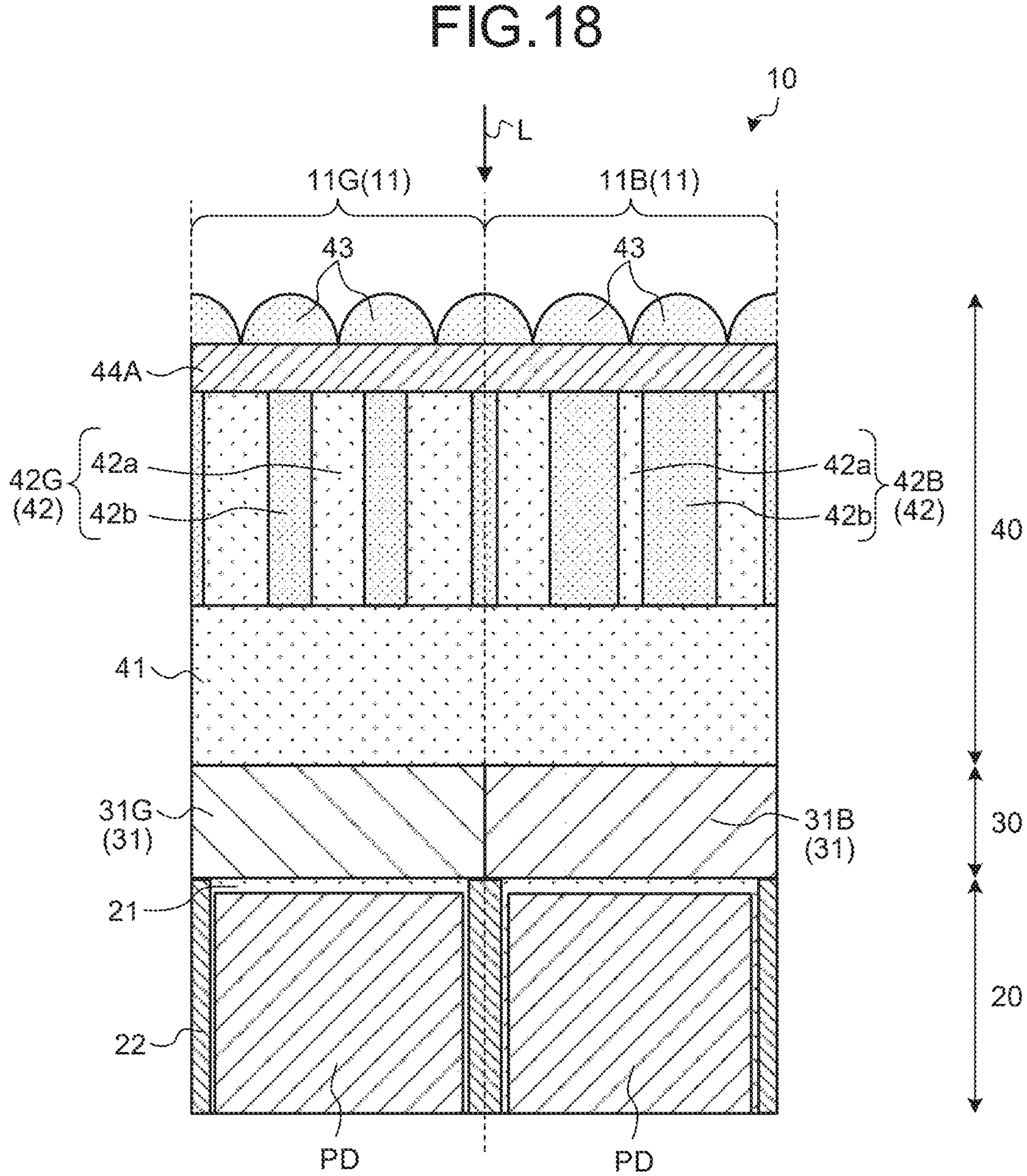
FIG. 18 is a cross-sectional view schematically illustrating a structure of a pixel array according to a sixth modified example of the embodiment of the present disclosure.
Figure 19:
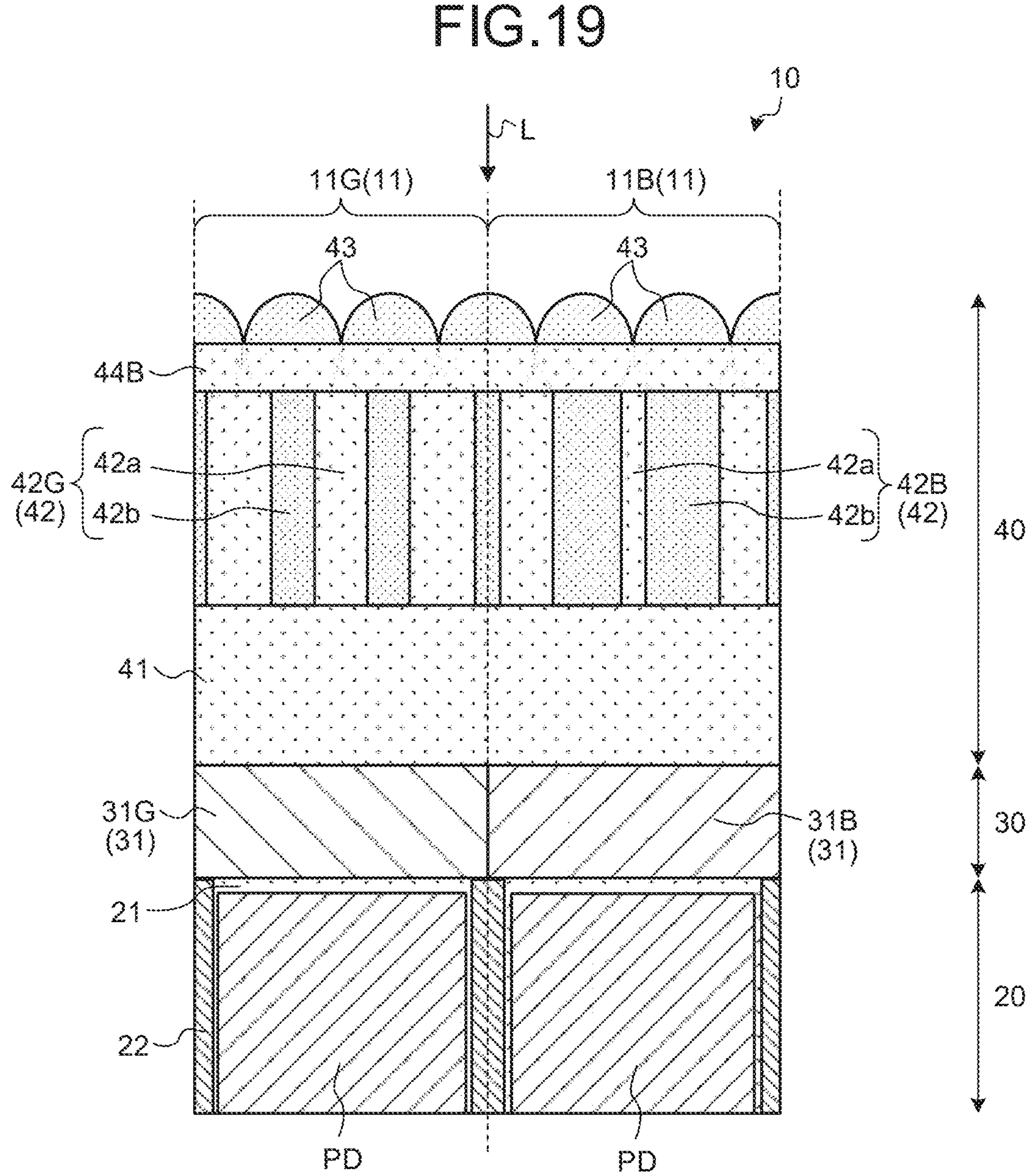
FIG. 19 is a cross-sectional view schematically illustrating a structure of a pixel array according to a seventh modified example of the embodiment of the present disclosure.

FIG. 17 to FIG. 19 are cross-sectional views schematically illustrating structures of the pixel array 10 according to fifth to seventh modified examples of the embodiment of the present disclosure. In the pixel array 10 according to the fifth modified example, the configuration of the spectral layer 40 is different from that of the above-described embodiment.

Specifically, in the fifth modified example, a intermediate layer 44 is disposed between the color splitter layer 42 and the plurality of condensers 43, as illustrated in FIG. 17. The intermediate layer 44 is made of, for example, the same material as the high refractive index portion 42*b* and the condenser 43.

In the fifth modified example, by providing the intermediate layer 44 between the color splitter layer 42 and the plurality of condensers 43, it is possible to secure a distance necessary to allow the incident light L incident on the condenser 43 to be incident on the corresponding high refractive index portion 42*b*. As a result, it is possible to further curb light from being incident on the low refractive index layer 42*a*.

As a result, since the phase of the light can be satisfactorily aligned inside the color splitter 42G or the like, the state of plane waves can be satisfactorily maintained even after the light is emitted from the color splitter 42G or the like. That is, in the fifth modified example, since desired spectral characteristics can be satisfactorily obtained, light from an adjacent region can be satisfactorily incident on the photodiode PD.

Therefore, according to the fifth modified example, the sensitivity of the pixel array 10 can be further improved.

Further, in the fifth modified example, the intermediate layer 44 may be made of the same material as the high refractive index portion 42*b* and the condenser 43. As a result, it is possible to curb a reflection phenomenon at the interface between the high refractive index portion 42*b* and the intermediate layer 44 and the interface between the intermediate layer 44 and the condenser 43.

Therefore, according to the fifth modified example, since the incident light L can be efficiently incident on the high refractive index portion 42*b*, the sensitivity of the pixel array 10 can be further improved.

Note that in the present disclosure, the intermediate layer 44 may not be made of the same material as the high refractive index portion 42*b* and the condenser 43. For example, as illustrated in FIG. 18, a stopper film 44A may be disposed between the color splitter layer 42 and the plurality of condensers 43.

The stopper film 44A is another example of the intermediate layer, and is made of a material different from that of the condenser 43. The stopper film 44A serves as an etching stopper when a desired shape (for example, a hemispherical shape) is formed in the process of forming the plurality of condensers 43.

The stopper film 44A is made of, for example, a silicon compound such as silicon nitride or silicon carbide, a metal oxide such as titanium oxide, tantalum oxide, niobium oxide, hafnium oxide, indium oxide, or tin oxide, or a composite oxide thereof.

Accordingly, by providing the stopper film 44A between the color splitter layer 42 and the plurality of condensers 43, it is possible to secure a distance necessary to allow the incident light L incident on the condensers 43 to be incident on a desired high refractive index portion 42*b*. As a result, it is possible to further curb light from being incident on the low refractive index layer 42*a*.

As a result, since the phase of the light can be satisfactorily aligned inside the color splitter 42G or the like, the state of plane waves can be satisfactorily maintained even after the light is emitted from the color splitter 42G or the like. That is, in the sixth modified example, since desired spectral characteristics can be satisfactorily obtained, light from an adjacent region can be satisfactorily incident on the photodiode PD.

Therefore, according to the sixth modified example, the sensitivity of the pixel array 10 can be further improved.

Further, in the present disclosure, as illustrated in FIG. 19, a intermediate layer 44B may be made of the same material as the low refractive index layer 42*a*. That is, the intermediate layer 44B of the seventh modified example is made of, for example, a metal oxide such as silicon oxide or aluminum oxide, or an organic substance such as an acrylic resin.

Accordingly, by providing the intermediate layer 44B between the color splitter layer 42 and the plurality of condensers 43, it is possible to secure a distance necessary to allow the incident light L incident on the condensers 43 to be incident on a desired high refractive index portion 42*b*. As a result, it is possible to further curb light from being incident on the low refractive index layer 42*a*.

As a result, since the phase of the light can be satisfactorily aligned inside the color splitter 42G or the like, the state of plane waves can be satisfactorily maintained even after the light is emitted from the color splitter 42G or the like. That is, in the seventh modified example, since desired spectral characteristics can be satisfactorily obtained, light from an adjacent region can be satisfactorily incident on the photodiode PD.

Therefore, according to seventh modified example, the sensitivity of the pixel array 10 can be further improved.

Eighth Modified Example

Figure 20:
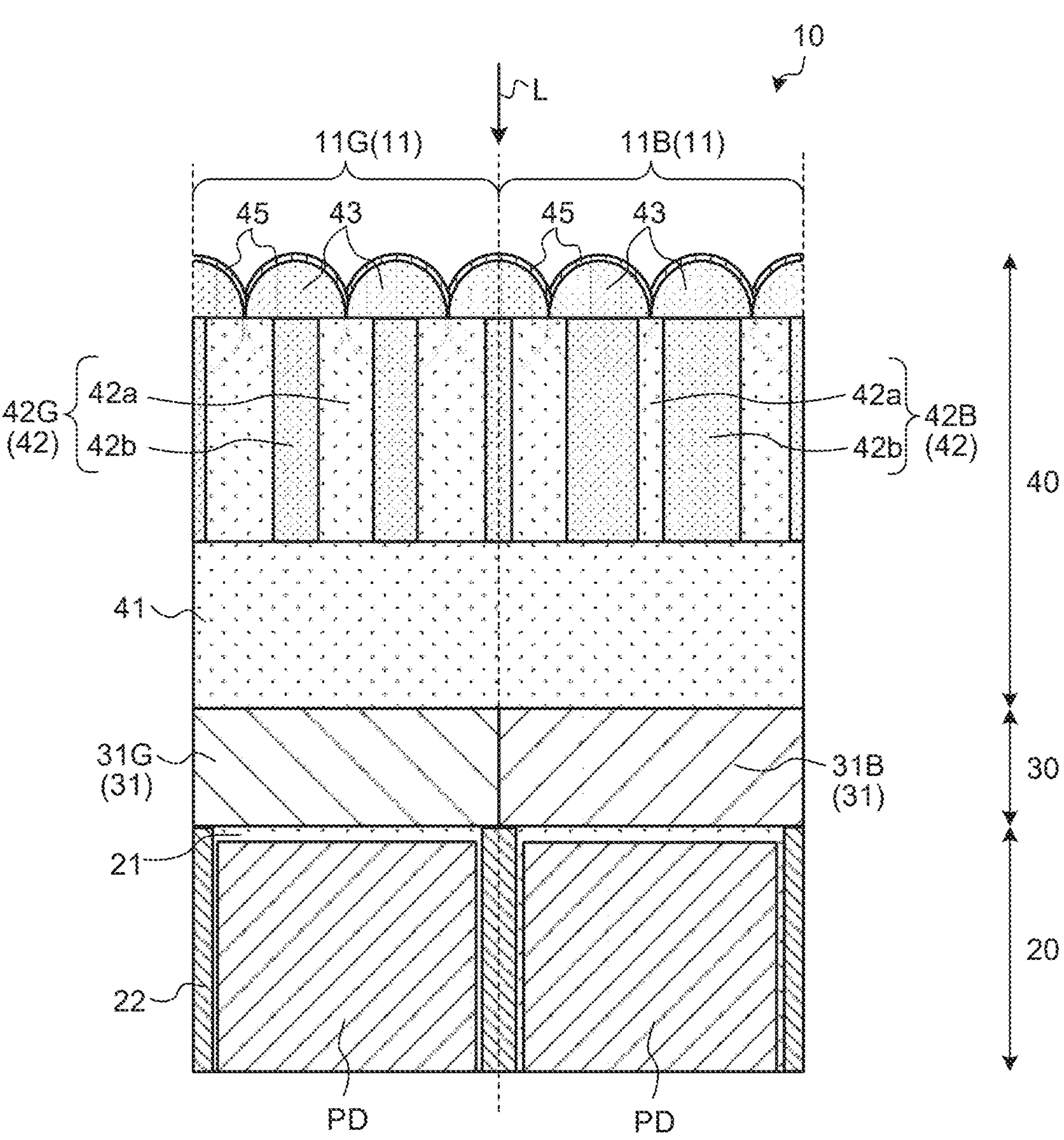
FIG. 20 is a cross-sectional view schematically illustrating a structure of a pixel array according to an eighth modified example of the embodiment of the present disclosure.

FIG. 20 is a cross-sectional view schematically illustrating a structure of the pixel array 10 according to an eighth modified example of the embodiment of the present disclosure. In the pixel array 10 according to the eighth modified example, the configuration of the condenser 43 is different from that of the above-described embodiment.

Specifically, in the eighth modified example, an antireflection film 45 is disposed on the surface of the condenser 43, as illustrated in FIG. 20. The antireflection film 45 curbs reflection of the incident light L on the surface of the condenser 43. As a result, the amount of light incident on the inside of the pixel array 10 can be increased, and thus the sensitivity of the solid-state imaging element 1 can be improved.

Ninth Modified Example

Figure 21:
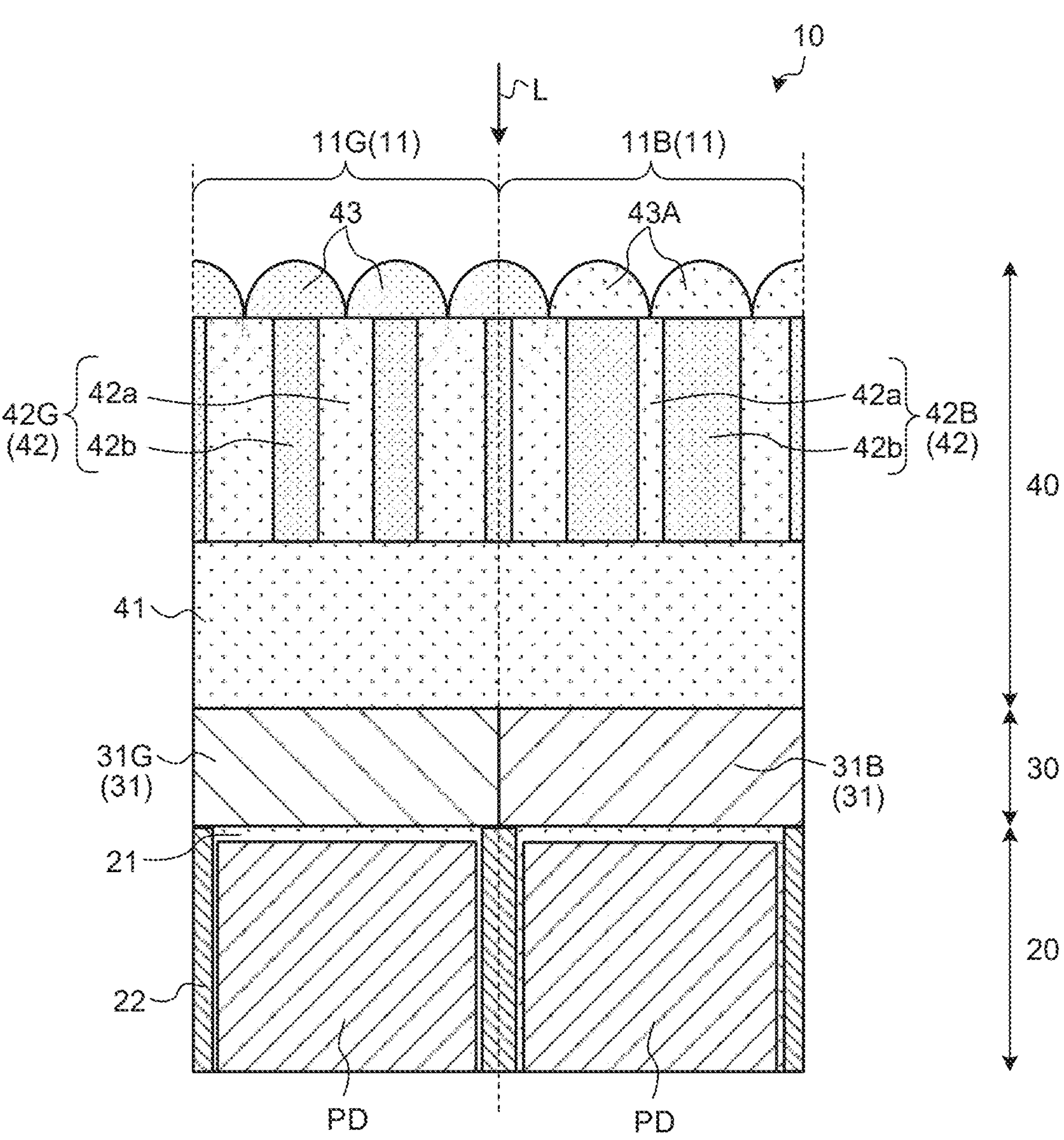
FIG. 21 is a cross-sectional view schematically illustrating a structure of a pixel array according to a ninth modified example of the embodiment of the present disclosure.

FIG. 21 is a cross-sectional view schematically illustrating a structure of the pixel array 10 according to a ninth modified example of the embodiment of the present disclosure. In the pixel array 10 according to the ninth modified example, the configuration of the condenser 43 is different from that of the above-described embodiment.

Specifically, in the ninth modified example, some condensers 43 are replaced with condensers 43A made of a material different from the material of the condensers 43, as illustrated in FIG. 21. For example, the condenser 43A may be replaced for each pixel 11 or may be replaced for each high refractive index portion 42*b*.

Accordingly, by providing the condensers 43 and 43A for condensing the incident light L on the high refractive index portions 42*b*, it is possible to curb the light from being incident on the low refractive index layer 42*a*.

As a result, since the phase of the light can be aligned inside the color splitter 42G or the like, the state of plane waves can be maintained even after the light is emitted from the color splitter 42G or the like. That is, in the ninth modified example, desired spectral characteristics can be sufficiently obtained, and thus light from an adjacent region can be sufficiently incident on the photodiode PD.

Therefore, according to the ninth modified example, the sensitivity of the pixel array 10 can be improved. Note that an example in which the condensers are made of two types of materials has been described in the example of FIG. 21, but the present disclosure is not limited to such an example, and the condensers may be made of three or more types of materials.

Tenth Modified Example

Figure 22:
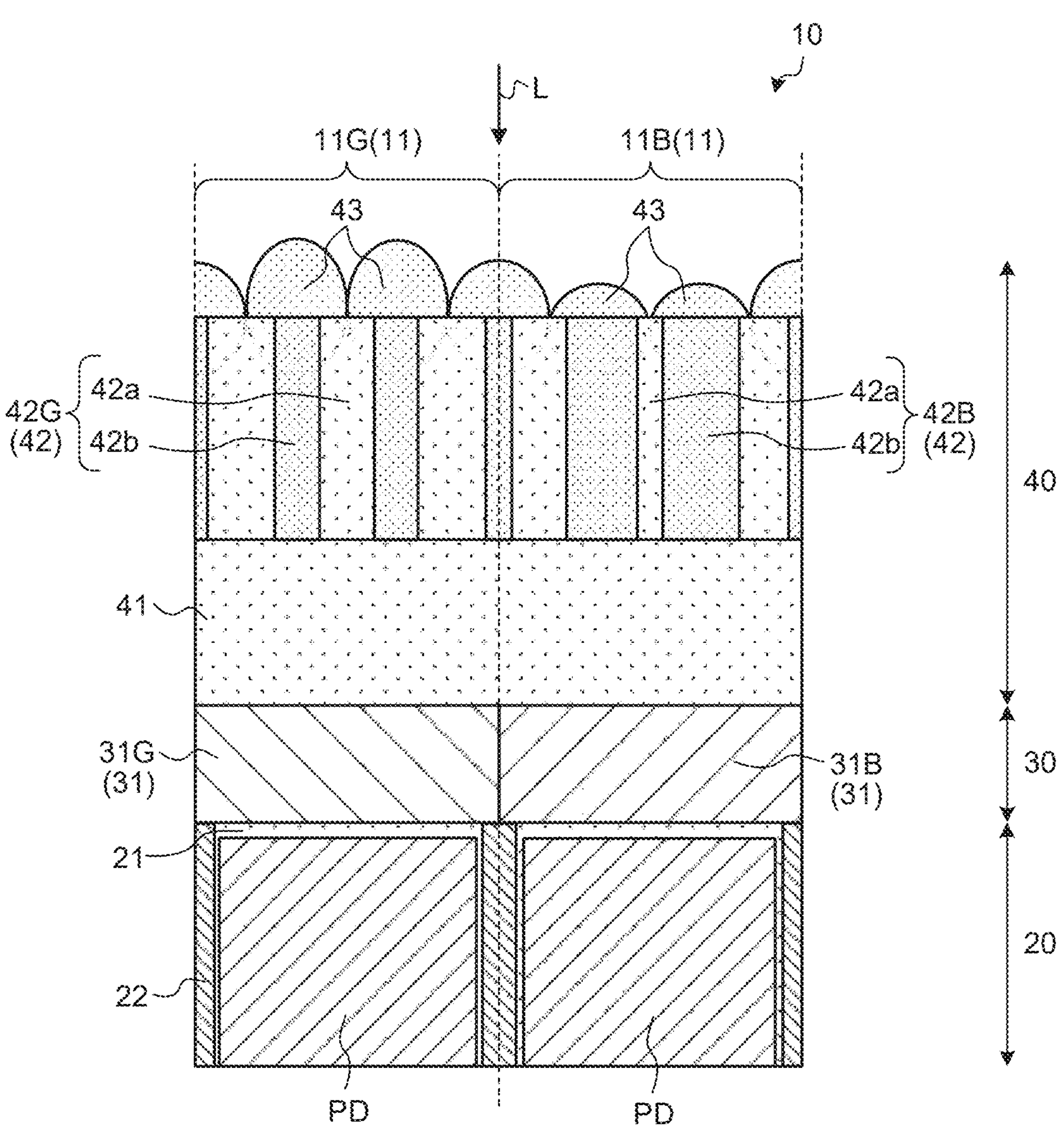
FIG. 22 is a cross-sectional view schematically illustrating a structure of a pixel array according to a tenth modified example of the embodiment of the present disclosure.

FIG. 22 is a cross-sectional view schematically illustrating a structure of the pixel array 10 according to a tenth modified example of the embodiment of the present disclosure. In the pixel array 10 according to the tenth modified example, the configuration of the condenser 43 is different from that of the above-described embodiment.

Specifically, in the tenth modified example, not all the condensers 43 have the same shape, and the plurality of condensers 43 have two or more types of shapes, as illustrated in FIG. 22. For example, in the example of FIG. 22, hemispherical condensers 43 have two or more types of radii of curvature.

Accordingly, by providing the condenser 43 that condenses the incident light L on each high refractive index portion 42*b*, it is possible to curb the light from being incident on the low refractive index layer 42*a*.

As a result, since the phase of the light can be aligned inside the color splitter 42G or the like, the state of plane waves can be maintained even after the light is emitted from the color splitter 42G or the like. That is, in the tenth modified example, desired spectral characteristics can be sufficiently obtained, and thus light from an adjacent region can be sufficiently incident on the photodiode PD.

Therefore, according to the tenth modified example, the sensitivity of the pixel array 10 can be improved.

Eleventh and Twelfth Modified Examples

Figure 23:
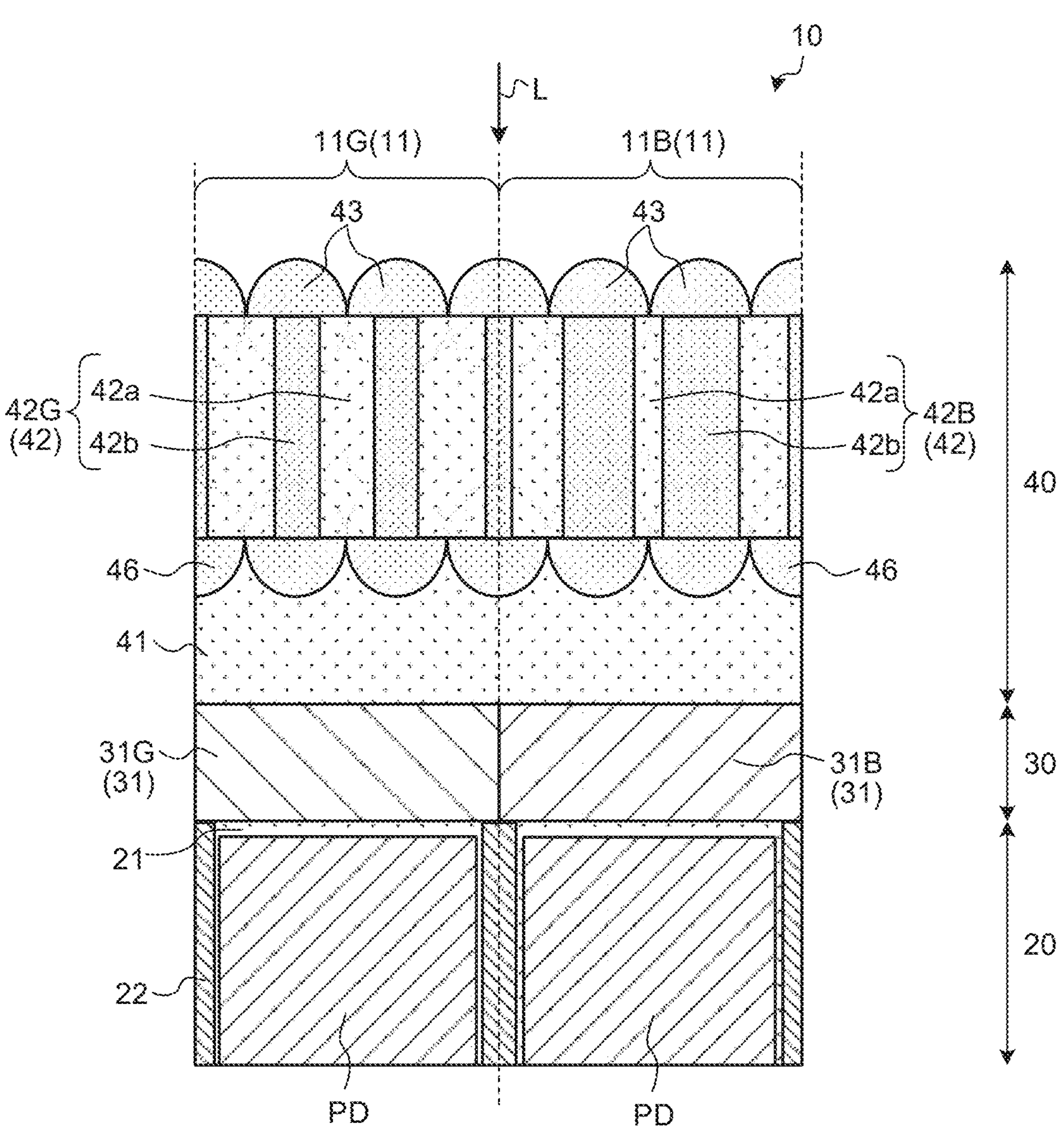
FIG. 23 is a cross-sectional view schematically illustrating a structure of a pixel array according to an eleventh modified example of the embodiment of the present disclosure.
Figure 24:
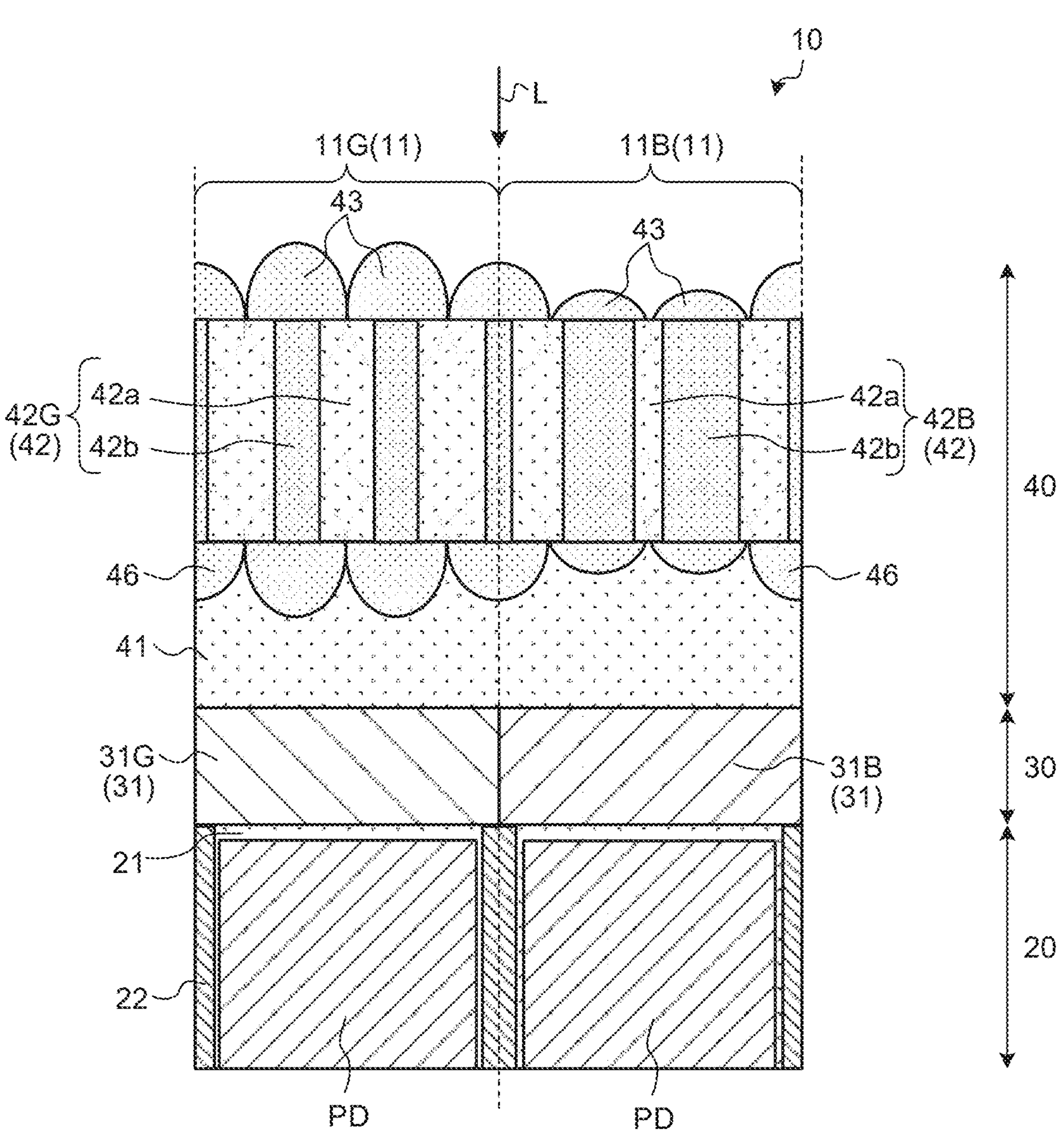
FIG. 24 is a cross-sectional view schematically illustrating a structure of a pixel array according to a twelfth modified example of the embodiment of the present disclosure.

FIG. 23 and FIG. 24 are cross-sectional views schematically illustrating structures of the pixel array 10 according to eleventh and twelfth modified examples of the embodiment of the present disclosure. In the pixel array 10 according to the eleventh modified example, the configuration of the spectral layer 40 is different from that of the above-described embodiment.

Specifically, in the eleventh modified example, a plurality of optical elements 46 are disposed between the intermediate layer 41 and the color splitter layer 42, as illustrated in FIG. 23. One optical element 46 is disposed for each high refractive index portion 42*b*, and has a function of returning light that has passed through the high refractive index portion 42*b* to plane waves. The optical element 46 has, for example, a hemispherical shape protruding downward.

As a result, the light emitted from the color splitter 42G or the like can be satisfactorily maintained in a state of plane waves. That is, in the eleventh modified example, desired spectral characteristics can be satisfactorily obtained, and thus light from an adjacent region can be satisfactorily incident on the photodiode PD.

Therefore, according to the eleventh modified example, the sensitivity of the pixel array 10 can be further improved.

Note that the present disclosure is not limited to a case where all the optical elements 46 have the same shape, and the plurality of optical elements 46 may have two or more types of shapes as illustrated in FIG. 24. For example, in the example of FIG. 24, the hemispherical optical elements 46 have two or more types of radii of curvature.

Further, in the example of FIG. 24, the condenser 43 and the optical element 46 optically connected to the same high refractive index portion 42*b* have substantially the same radius of curvature.

As a result, the light emitted from the color splitter 42G or the like can be satisfactorily maintained in a state of plane waves. That is, in the twelfth modified example, desired spectral characteristics can be satisfactorily obtained, and thus light from an adjacent region can be satisfactorily incident on the photodiode PD.

Therefore, according to the twelfth modified example, the sensitivity of the pixel array 10 can be further improved.

[Effects]

The light detection element (solid-state imaging element 1) according to the embodiment includes a plurality of photoelectric converters (photodiodes PD), a color splitter layer 42, and a plurality of condensers 43. The plurality of photoelectric converters (photodiodes PD) are disposed side by side in a matrix in the semiconductor layer 20. The color splitter layer 42 is disposed on the light incident side with respect to the plurality of photoelectric converters (photodiodes PD), and includes the low refractive index layer 42*a* and the plurality of columnar high refractive index portions 42*b*. The plurality of condensers 43 are disposed on the light incident side with respect to the color splitter layer 42, and condense incident light to the corresponding high refractive index portions 42*b*.

As a result, the sensitivity of the solid-state imaging element 1 can be improved.

Furthermore, in the light detection element (solid-state imaging element 1) according to the embodiment, the color splitter layer 42 has a meta-surface structure.

As a result, the sensitivity of the solid-state imaging element 1 can be improved.

Furthermore, in the light detection element (solid-state imaging element 1) according to the embodiment, the condenser 43 is disposed to cover the corresponding high refractive index portion 42*b*.

As a result, the sensitivity of the solid-state imaging element 1 can be further improved.

Furthermore, in the light detection element (solid-state imaging element 1) according to the embodiment, the condenser 43 is disposed to be in contact with the corresponding high refractive index portion 42*b*.

As a result, the sensitivity of the solid-state imaging element 1 can be further improved.

Furthermore, the light detection element (solid-state imaging element 1) according to the embodiment further includes the intermediate layer 44 disposed between the color splitter layer 42 and the plurality of condensers 43.

As a result, the sensitivity of the solid-state imaging element 1 can be further improved.

Furthermore, in the light detection element (solid-state imaging element 1) according to the embodiment, the condenser 43 is made of the same material as the high refractive index portion 42*b*.

As a result, the sensitivity of the solid-state imaging element 1 can be further improved.

Furthermore, in the light detection element (solid-state imaging element 1) according to the embodiment, the plurality of condensers 43 are disposed to cover the color splitter layer 42 without any gap.

As a result, the sensitivity of the solid-state imaging element 1 can be further improved.

Furthermore, in the light detection element (solid-state imaging element 1) according to the embodiment, the condenser 43 has a hemispherical shape.

As a result, the sensitivity of the solid-state imaging element 1 can be further improved.

Furthermore, the light detection element (solid-state imaging element 1) according to the embodiment further includes the antireflection film 45 disposed on the surface of the condenser 43.

As a result, the sensitivity of the solid-state imaging element 1 can be further improved.

Furthermore, the light detection element (solid-state imaging element 1) according to the embodiment further includes the plurality of optical elements 46 that are disposed on the opposite side with respect to the light incident side from the color splitter layer 42 and return the light that has passed through each of the plurality of high refractive index portions 42*b* to plane waves.

As a result, the sensitivity of the solid-state imaging element 1 can be further improved.

[Electronic Apparatus]

Note that the present disclosure is not limited to application to a solid-state imaging element. That is, the present disclosure is applicable to all electronic apparatuses having a solid-state imaging element, which include a camera module, an imaging device, a mobile terminal device having an imaging function, or a copying machine using a solid-state imaging element in an image reading unit, in addition to the solid-state imaging element.

Examples of such an imaging device include a digital still camera, a video camera, and the like. Examples of such a mobile terminal device having an imaging function include a smartphone, a tablet terminal, and the like.

Figure 25:
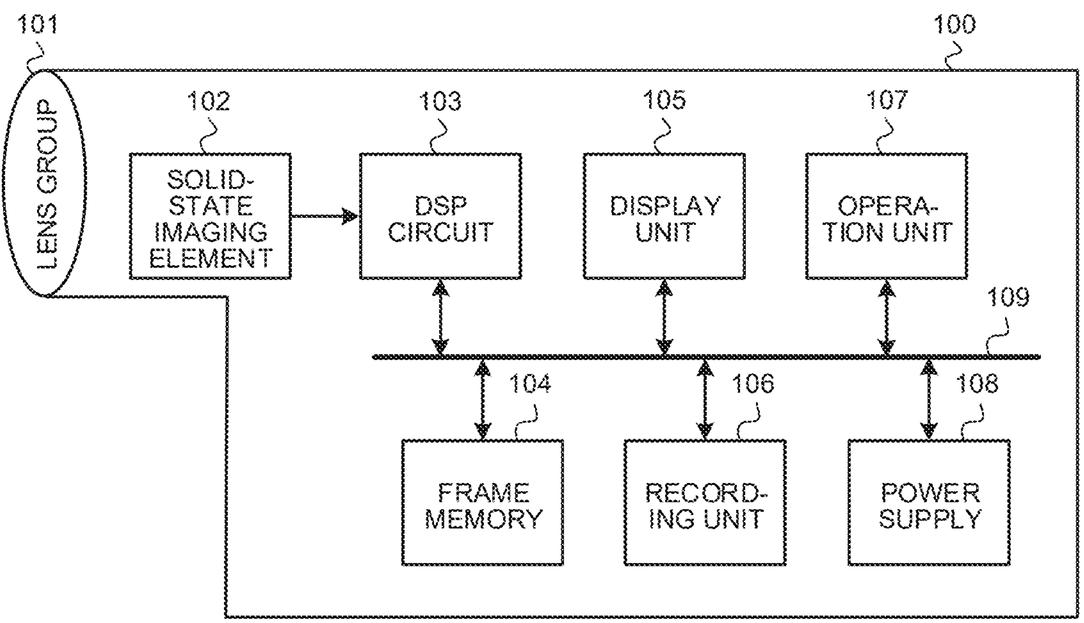
FIG. 25 is a block diagram illustrating a configuration example of an imaging device as an electronic apparatus to which the technology according to the present disclosure is applied.

FIG. 25 is a block diagram illustrating a configuration example of an imaging device as an electronic apparatus 100 to which the technology according to the present disclosure is applied. The electronic apparatus 100 in FIG. 25 is, for example, an electronic apparatus such as an imaging device such as a digital still camera or a video camera, or a mobile terminal device such as a smartphone or a tablet terminal.

In FIG. 25, the electronic apparatus 100 includes a lens group 101, a solid-state imaging element 102, a DSP circuit 103, a frame memory 104, a display unit 105, a recording unit 106, an operation unit 107, and a power supply 108.

Furthermore, in the electronic apparatus 100, the DSP circuit 103, the frame memory 104, the display unit 105, the recording unit 106, the operation unit 107, and the power supply 108 are mutually connected via a bus line 109.

The lens group 101 captures incident light (image light) from a subject and forms an image on an imaging surface of the solid-state imaging element 102. The solid-state imaging element 102 corresponds to the solid-state imaging element 1 according to the above-described embodiment, converts the amount of incident light imaged on the imaging surface by the lens group 101 into an electrical signal in units of pixels and outputs the electrical signal as a pixel signal.

The DSP circuit 103 is a camera signal processing circuit that processes a signal supplied from the solid-state imaging element 102. The frame memory 104 temporarily holds image data processed by the DSP circuit 103 in units of frames.

The display unit 105 includes, for example, a panel type display device such as a liquid crystal panel or an organic electroluminescence (EL) panel, and displays a moving image or a still image captured by the solid-state imaging element 102. The recording unit 106 records image data of a moving image or a still image captured by the solid-state imaging element 102 on a recording medium such as a semiconductor memory or a hard disk.

The operation unit 107 issues operation commands for various functions of the electronic apparatus 100 in accordance with an operation of a user. The power supply 108 appropriately supplies various powers to be operation powers of the DSP circuit 103, the frame memory 104, the display unit 105, the recording unit 106, and the operation unit 107 to these supply targets.

In the electronic apparatus 100 configured as described above, the sensitivity of the solid-state imaging element 102 can be improved by applying the solid-state imaging element 1 of each of the above-described embodiments as the solid-state imaging element 102.

Although the embodiments of the present disclosure have been described above, the technical scope of the present disclosure is not limited to the above-described embodiments as it is, and various modifications can be made without departing from the gist of the present disclosure. In addition, components of different embodiments and modified examples may be appropriately combined.

Furthermore, the effects described in the present specification are merely examples and are not limited, and other effects may be provided.

Note that the present technology can also have the following configurations.

(1)

A light detection element comprising:

a plurality of photoelectric converters disposed side by side in a matrix form in a semiconductor layer;

a color splitter layer disposed on a light incident side with respect to the plurality of photoelectric converters and including a low refractive index layer and a plurality of columnar high refractive index portions; and a plurality of condensers disposed on a light incident side with respect to the color splitter layer and condensing incident light to the corresponding high refractive index portions.

(2)

The light detection element according to the above (1), wherein the color splitter layer has a meta-surface structure.

(3)

The light detection element according to the above (1) or (2), wherein the condensers are disposed to cover the corresponding high refractive index portions from a light incident side.

(4)

The light detection element according to any one of the above (1) to (3), wherein the condensers are disposed to be in contact with the corresponding high refractive index portions.

(5)

The light detection element according to any one of the above (1) to (3), further comprising an intermediate layer disposed between the color splitter layer and the plurality of condensers.

(6)

The light detection element according to any one of the above (1) to (5), wherein the condensers are made of the same material as the high refractive index portions.

(7)

The light detection element according to any one of the above (1) to (6), wherein the plurality of condensers are disposed to cover the color splitter layers without any gap.

(8)

The light detection element according to any one of the above (1) to (7), wherein the condensers have a hemispherical shape.

(9)

The light detection element according to any one of the above (1) to (8), further comprising an antireflection film disposed on a surface of the condensers.

(10)

The light detection element according to any one of the above (1) to (9), further comprising a plurality of optical elements disposed on the opposite side to a light incident side with respect to the color splitter layer and configured to return light that has passed through each of the plurality of high refractive index portions to plane waves.

(11)

An electronic apparatus comprising:

a light detection element;

an optical system configured to capture incident light from an object to be detected and form an image on a light detection surface of the light detection element; and a signal processing circuit configured to perform processing on an output signal from the light detection element, wherein the light detection element includes:

a plurality of photoelectric converters disposed side by side in a matrix form in a semiconductor layer;

a color splitter layer disposed on a light incident side with respect to the plurality of photoelectric converters and including a low refractive index layer and a plurality of columnar high refractive index portions; and a plurality of condensers disposed on a light incident side with respect to the color splitter layer and condensing incident light to the corresponding high refractive index portions.

(12)

The electronic apparatus according to the above (11), wherein the color splitter layer has a meta-surface structure.

(13)

The electronic apparatus according to the above (11) or (12), wherein the condensers are disposed to cover corresponding high refractive index portions.

(14)

The electronic apparatus according to any one of the above (11) to (13), wherein the condensers are disposed to be in contact with the corresponding high refractive index portions.

(15)

The electronic apparatus according to any one of the above (11) to (13), further including an intermediate layer disposed between the color splitter layer and the plurality of condensers.

(16)

The electronic apparatus according to any one of the above (11) to (15), wherein the condensers are made of the same material as the high refractive index portions.

(17)

The electronic apparatus according to any one of the above (11) to (16), wherein the plurality of condensers are disposed to cover the color splitter layer without any gap.

(18)

The electronic apparatus according to any one of the above (11) to (17), wherein the condensers have a hemispherical shape.

(19)

The electronic apparatus according to any one of the above (11) to (18), further including an antireflection film disposed on the surface of the condensers.

(20)

The electronic apparatus according to any one of the above (11) to (19), further including a plurality of optical elements disposed on the opposite side to a light incident side with respect to the color splitter layer and configured to return light that has passed through each of the plurality of high refractive index portions to plane waves.

REFERENCE SIGN LIST

1 SOLID-STATE IMAGING ELEMENT (EXAMPLE OF LIGHT DETECTION ELEMENT)
10 PIXEL ARRAY
20 SEMICONDUCTOR LAYER
40 SPECTRAL LAYER
42 COLOR SPLITTER LAYER
**42*a*** LOW REFRACTIVE INDEX LAYER
**42*b*** HIGH REFRACTIVE INDEX PORTION
42G, 42B COLOR SPLITTER
43, 43A CONDENSER
44, 44B INTERMEDIATE LAYER
44A STOPPER FILM (ANOTHER EXAMPLE OF INTERMEDIATE LAYER)
5 ANTIREFLECTION FILM
46 OPTICAL ELEMENT
100 ELECTRONIC APPARATUS
PD PHOTODIODE (EXAMPLE OF PHOTOELECTRIC CONVERTER)

What is claimed is:

1. A light detection element, comprising:

a plurality of photoelectric converters disposed side by side in a matrix form in a semiconductor layer;

a color splitter layer disposed on a light incident side with respect to the plurality of photoelectric converters and including a low refractive index layer and a plurality of columnar high refractive index portions; and a plurality of condensers disposed on a light incident side with respect to the color splitter layer and condensing incident light to corresponding high refractive index portions, wherein one condenser in the plurality of condensers is provided for each columnar high refractive index portion in the plurality of columnar high refractive index portions.

2. The light detection element according to claim 1, wherein the color splitter layer has a meta-surface structure.

3. The light detection element according to claim 1, wherein the condensers are disposed to cover the corresponding high refractive index portions from a light incident side.

4. The light detection element according to claim 1, wherein the condensers are disposed to be in direct contact with the corresponding high refractive index portions.

5. The light detection element according to claim 1, further comprising an intermediate layer disposed between the color splitter layer and the plurality of condensers.

6. The light detection element according to claim 1, wherein the condensers are made of a same material as the high refractive index portions.

7. The light detection element according to claim 1, wherein the plurality of condensers are disposed to cover the color splitter layers without any gap.

8. The light detection element according to claim 1, wherein the condensers have a hemispherical shape.

9. The light detection element according to claim 1, further comprising an antireflection film disposed on a surface of the condensers.

10. The light detection element according to claim 1, further comprising a plurality of optical elements disposed on an opposite side to a light incident side with respect to the color splitter layer and configured to return light that has passed through each of the plurality of high refractive index portions to plane waves.

11. An electronic apparatus, comprising:

a light detection element;

an optical system configured to capture incident light from an object to be detected and form an image on a light detection surface of the light detection element; and a signal processing circuit configured to perform processing on an output signal from the light detection element, wherein the light detection element includes:

a plurality of photoelectric converters disposed side by side in a matrix form in a semiconductor layer;

a color splitter layer disposed on a light incident side with respect to the plurality of photoelectric converters and including a low refractive index layer and a plurality of columnar high refractive index portions; and a plurality of condensers disposed on a light incident side with respect to the color splitter layer and condensing incident light to corresponding high refractive index portions, wherein one condenser in the plurality of condensers is provided for each columnar high refractive index portion in the plurality of columnar high refractive index portions.

* * * * *